United States Patent [19]
Horikiri et al.

[11] Patent Number: 5,765,154
[45] Date of Patent: Jun. 9, 1998

[54] RESOURCE MANAGEMENT SYSTEM

[75] Inventors: Kazunori Horikiri; Shigehisa Kawabe, both of Nakai-machi, Japan

[73] Assignee: Fuji Xerox Co., Ltd., Tokyo, Japan

[21] Appl. No.: 731,779

[22] Filed: Oct. 18, 1996

[30] Foreign Application Priority Data

Oct. 19, 1995 [JP] Japan .................................. 7-271570
Feb. 26, 1996 [JP] Japan .................................. 8-038559

[51] Int. Cl.$^6$ .................................................. G06F 17/30
[52] U.S. Cl. ........................ 707/10; 707/2; 707/104; 707/100
[58] Field of Search ............................ 707/10, 2, 104, 707/100

[56] References Cited

U.S. PATENT DOCUMENTS

| | | | |
|---|---|---|---|
| 5,151,989 | 9/1992 | Johnson et al. | 707/10 |
| 5,377,323 | 12/1994 | Vasudevan | 395/200.56 |
| 5,434,974 | 7/1995 | Loucks et al. | 707/101 |
| 5,465,365 | 11/1995 | Winterbottom | 707/101 |
| 5,491,817 | 2/1996 | Gopal et al. | 707/200 |
| 5,623,666 | 4/1997 | Pike et al. | 707/200 |

FOREIGN PATENT DOCUMENTS

| | | |
|---|---|---|
| A-5-189389 | 7/1993 | Japan . |
| A-5-216799 | 8/1993 | Japan . |
| A-5-274274 | 10/1993 | Japan . |
| A-5-342134 | 12/1993 | Japan . |

OTHER PUBLICATIONS

"A Model of Name Resolution in Distributed Systems", Douglas E. Comer et al., in the Proceedings of the 6th International Conference on Distributed Computing Systems (1986), pp. 523–530.

"Local Area Network Ethernet Outline", Akihiro Uetani, Second Edition, Maruzen Publishing K.K., (1989) pp. 222–229.

"The Successor to the Distributed Operating System UNIX", Kentaro Shimizu et al., (1991) pp. 243–264.

"Name Management in Distributed Operating System", Computer Software, vol. 6, No. 3 (1989), pp. 19–34.

*Primary Examiner*—Wayne Amsbury
*Attorney, Agent, or Firm*—Oliff & Berridge, PLC

[57] ABSTRACT

A resource management system, of the type wherein processes are applied to real resources, which are resources previously input into a computer system that performs information processing, to obtain new resources, includes a plurality of context maintaining units that respectively establish a correspondence with attributes. Each of the context maintaining units includes an attribute maintaining unit that stores in memory attributes of the respective context maintaining unit; a name analysis unit that performs name analysis on resource names using as input resource names given to the resources, to obtain name analysis results; and a name conversion unit that converts name analysis results from the name analysis unit into one of a first resource realization expression and a second resource realization expression. The system further includes a selection unit that creates second context search expressions used in searching at least one of the plurality of context maintaining units on the basis of expressions that have been previously input, using as input expressions used to select at least one of the plurality of context maintaining units; a context search unit that searches one of a context maintaining unit having attributes in accordance with first context search expressions obtained by the name conversion unit of the context maintaining unit and a context maintaining unit having attributes in accordance with second context search expressions created by the selection unit; and an extraction unit that outputs a context expression which includes information necessary to create a context maintaining unit equivalent to the context maintaining unit searched by the context search unit on the basis of the second context search expressions.

33 Claims, 23 Drawing Sheets

```
Set<Ref<Class Context>>subcontext;
Context->query(subcontext,
"select distinct x from Context-A where\
      x. property. owner="Smith" \
      and x. property. mdate>95. 3. 16\
      and x. property. category=\"picture\ "."
);
```

FIG.4(A)

```
select distinct x from Context-A where
      x. property. owner="Smith"
      and x. property. mdate>95. 3. 16
      and x. property. category= "picture"
```

FIG.4(B)

(Struct Context
　　(property (owner "Smith") (mdate 95. 3. 18)
　　　　　　　　　　　　　　　(category "picture"))
　　(analyzer procedure 3-1)
　　(trans procedure 4-1))

FIG.5(A)

(Struct Context
　　(property (owner "Smith") (mdate 95. 11. 14)
　　　　　　　　　　　　　　　(category "picture"))
　　(analyzer procedure 3-2)
　　(trans procedure 4-2))

FIG.5(B)

```
((Struct Context
    (property (owner "Smith") (mdate 95. 3. 18)
                              (category "picture"))
    (analyzer procedure 3-1)
    (trans procedure 4-1))
 (Struct Context
    (property (owner "Smith") (mdate 95. 11. 14)
                              (category "picture"))
    (analyzer procedure 3-2)
    (trans procedure 4-2))
)
```

FIG.5(C)

```
element (select x from Context-B where
         x. property. owner = "Smith"
     and x. property. mdate = 95. 3. 18
     and x. property. category = "picture"
)
```

FIG.6

```
Set<Ref<Class Context>>subcontext;
Context->query(subcontext,
"select distinct x from Context-A where\
    x. property. owner="Smith" \
    and x. property. mdate>95. 3. 16\
    and x. property. category=\"picture\ ""
);
cout<<subcontext;
```

FIG.9(A)

```
select distinct x from Context-A where
    x. property. owner="Smith"
    and x. property. mdate>95. 3. 16
    and x. property. category= "picture"
```

FIG.9(B)

```
(Struct Context
    (property (owner "Smith") (mdate 95. 3. 18)
                              (category "picture"))
    (analyzer procedure 3-1)
    (trans procedure 4-1)
    (extract procedure 13-1)
)
```

FIG.10(A)

```
(Struct Context
    (property (owner "Smith") (mdate 95. 11. 14)
                              (category "picture"))
    (analyzer procedure 3-2)
    (trans procedure 4-2)
    (extract procedure 13-2)
)
```

FIG.10(B)

```
((Struct Context
    (property (owner "Smith") (mdate 95. 3. 18)
                              (category "picture"))
    (analyzer procedure 3-1)
    (trans procedure 4-1)
    (extract procedure 3-1)
  )
  (Struct Context
    (property (owner "Smith") (mdate 95. 11. 14)
                              (category "picture"))
    (analyzer procedure 3-2)
    (trans procedure 4-2)
    (extract procedure 13-2)
  ))
```

FIG.10(C)

| NAME | VIRTUAL RESOURCES |
|---|---|
| g-1 | member (<CONTEXT-2, 'Key-1'>) |
| g-2 | member (<CONTEXT-2, 'Key-2'>) |
| g-3 | member (<CONTEXT-2, 'Key-3'>) |
| g-4 | others (<CONTEXT-2, 'Key-1,Key-2,Key-3'>) |
| f-1 | resample (<FILE SYSTEM 4-1,F-1>) |
| f-2 | resample (<FILE SYSTEM 4-1,F-2>) |
| f-3 | resample (<FILE SYSTEM 4-1,F-3>) |
| ... | ... |
| f-10 | resample (<FILE SYSTEM 4-1,F-10>) |
| ... | ... |

FIG.20

| NAME | VIRTUAL RESOURCE |
|---|---|
| Key-1 | search (Key-1) |
| Key-2 | search (Key-2) |
| Key-3 | search (Key-3) |
| Key-4 | search (Key-4) |
| Key-5 | search (Key-5) |
| ALL | search (ALL) |

FIG.21

| KEYWORD | SEARCH REPORT |
|---|---|
| Key-1 | F-1,F-2,F-3 |
| Key-2 | F-4,F-5,F-6 |
| Key-3 | F-7,F-8,F-9 |
| Key-4 | F-1,F-3,F-5,F-7 |
| Key-5 | F-2,F-4,F-6,F-8 |
| ALL | F-1,F-2,F-3,F-4,F-5,F-6,F-7,F-8,F-9,F-10 |

FIG.22

```
<TITLE> CONTEXT -1</TITLE>
</HEAD>
<H2> NAME CONVERSION TABLE </H2>
<table border=0>
<tr><td>g-1</td><td>member(CONTEXT-2,'Key-1')</td></tr>
<tr><td>g-2</td><td>member(CONTEXT-2,'Key-2')</td></tr>
<tr><td>g-3</td><td>member(CONTEXT-2,'Key-3')</td></tr>
<tr><td>g-4</td><td>others(CONTEXT-2,'Key-1,Key-2,Key-3')</td></tr>
<tr><td>f-1</td><td>resample(<FILE SYSTEM 4-1,F-1>)</td></tr>
<tr><td>f-2</td><td>resample(<FILE SYSTEM 4-1,F-2>)</td></tr>
<tr><td>f-3</td><td>resample(<FILE SYSTEM 4-1,F-3>)</td></tr>
<tr><td>f-4</td><td>resample(<FILE SYSTEM 4-1,F-4>)</td></tr>
<tr><td>f-5</td><td>resample(<FILE SYSTEM 4-1,F-5>)</td></tr>
<tr><td>f-6</td><td>resample(<FILE SYSTEM 4-1,F-6>)</td></tr>
<tr><td>f-7</td><td>resample(<FILE SYSTEM 4-1,F-7>)</td></tr>
<tr><td>f-8</td><td>resample(<FILE SYSTEM 4-1,F-8>)</td></tr>
<tr><td>f-9</td><td>resample(<FILE SYSTEM 4-1,F-9>)</td></tr>
<tr><td>f-10</td><td>resample(<FILE SYSTEM 4-1,F-10>)</td></tr>
</table>
</BODY>
</HTML>
```

FIG.23

```
<TITLE> CONTEXT -2</TITLE>
</HEAD>
<H2> NAME CONVERSION TABLE </H2>
<tableborder=0>
<tr><td>K1</td><td>search(K1)</td></tr>
<tr><td>K2</td><td>search(K2)</td></tr>
<tr><td>K3</td><td>search(K3)</td></tr>
<tr><td>K4</td><td>search(K4)</td></tr>
<tr><td>K5</td><td>search(K5)</td></tr>
<tr><td>ALL</td><td>search(ALL)</td></tr>
</table>
</BODY>
</HTML>
```

FIG.24

| NAME | VIRTUAL RESOURCE |
|---|---|
| f-1 | check_and_copy (R-1,F-1) |
| f-2 | check_and_copy (R-2,F-2) |
| f-3 | check_and_copy (R-3,F-3) |
| f-4 | check_and_copy (R-4,F-4) |
| f-5 | check_and_copy (R-5,F-5) |
| ... | ... |
| f-10 | check_and_copy (R-10,F-10) |

FIG.26

| NAME | VIRTUAL RESOURCE |
|---|---|
| g-1 | member (CONTEXT-2, 'Key-1'>) |
| g-2 | member (CONTEXT-2, 'Key-2'>) |
| g-3 | member (CONTEXT-2, 'Key-3'>) |
| g-4 | others (CONTEXT-2, 'Key-1,Key-2,Key-3'>) |
| f-1 | <CONTEXT-3, f-1> |
| f-2 | <CONTEXT-3, f-2> |
| f-3 | <CONTEXT-3, f-3> |
| ... | ... |
| f-10 | <CONTEXT-3, f-10> |

FIG.27 f-1 NAME RESOLUTION TREE for A f-1 NAME RESOLUTION TREE for B

RESOURCE MANAGEMENT SYSTEM

BACKGROUND OF THE INVENTION

1. Field of Invention

The invention relates to a management method for resources which are handled by computer systems, in a network information system in which a plurality of computer systems that perform information processing are linked by a network.

2. Description of Related Art

In general resource management systems, the global name which complies with a predetermined naming rule is converted into a local name for the resource, an address, an identifier and some kind of attribute value. The conversion process is called name resolution. The object which performs name resolution is an environment that interprets a name and provides an entity indicating the name, and hence is called a context. After name resolution has been performed by the context, generally a handle, which handles resources that are determined for the names, is obtained. When the resource is a file, for example, the handle is a file handle which is used to read from the file, and when the resource is a remote printer, for example, the handle is a port for inter-process communication that is used to connect to the predetermined print service and to execute the print requirements.

When the name of a resource is input into the system, the context can obtain a handle for the resource based on the results of name resolution performed by the context. That is, the context object provides the site of name resolution, and consequently, the site is called the name space.

For example, the NIS of Sun Microsystems performs name resolution by interpreting the name of a predetermined resource of the network computer system. For example, when conversion to an IP address is performed after interpreting the host name of the computer, the host name tokkyo.pat.cojp is converted to an IP address such as 172.12.23.34. With NIS, the daemon program called ypserv runs in the server computer, and a daemon program called ypbind runs in the client computer.

The client process of the user outputs a request for name resolution to ypbind, ypbind outputs the request for name resolution to ypserv through inter-process communication, and ypserv performs name resolution by referencing the database used for conversion. The results are provided to the client through a route that is the reverse of the request route. In this way, NIS resolves a network through TCP/IP communication, and is a name service in which these run in conjunction with each other. In actuality, because the database used for converting names is searched by ypserv and name resolution is thus performed, ypserv may also be called another context.

As one type of conventional resource management method, the clearinghouse service resource management method of Xerox Corp. of the U.S. is cited, for example, in "Local Area Network Ethernet Outline" by Akihiro Uetani, Second Edition, Maruzen Publishing K.K. The clearinghouse service is a distributed database managed by a resource management method that manages by causing an arbitrary number of attributes to correspond to the names of resources in a distributed system.

In the clearinghouse service, it is possible to handle as attributes the type of resource, passwords, second names, the name of the file server, the name of the mailbox, the name of the printer, a group or a distribution target list or the like.

However, it is impossible to provide a function which can allow and handle, besides global names for the resources of a distributed system, names on the basis of a plurality of local naming rules in accordance with the needs or applications of various users.

Another resource management method is the GALAXY operating system resource management method which is disclosed in "The successor to the distributed operating system UNIX" by Kentaro Shimizu, Mamoru Maekawa and Hyo Ashihara, Kyoritsu Shuppan, pp. 243–264, and in "Computer Software", Vol. 6, No. 3 (1989), pp. 19–34. The GALAXY resource management method provides a plurality of contexts which are the environment for interpreting names, and structures the contexts as a set of directories composed of external names, conversion names and attribute lists.

The GALAXY resource management method maintains and manages the correspondence from external names to conversion names through a table using a hash table or B-tree or the like. Consequently, it is possible to allow and handle unified external names in the resources within the distributed system, so ease of operation is enhanced. Furthermore, for the same resource, it is possible to allow a different external name for each context, and consequently, for the resources of a distributed system, it is possible to provide local name spaces which can allow and handle a plurality of local names in accordance with applications and needs. However, the rule for naming and the rule for interpreting names is the same in all contexts, and consequently, it is impossible to handle the resource of a distributed system by stipulating differing rules for naming for each user and allowing flexible local names in accordance with needs and applications of the resources.

As yet another resource management method, there is a name resolution mechanism in distributed systems disclosed in "A Model of Name Resolution in Distributed Systems" by Douglas E. Comer and Larry L. Peterson in the Proceedings of the 6th International Conference on Distributed Computing Systems (1986), pp. 523–530. This name resolution mechanism starts from an initial context which the client process runs when the client process requires the name resolution corresponding to a specific resource, and repeatedly performs other contexts and name conversions which convert the names determined therein. Through this repeated execution, the context is successively moved, and is ultimately converted into a final context which actually manages resources determined in accordance with the names that are required in the client process, and the resource identifiers which the context can interpret. With this model, the ypbind of the NIS above is also a context.

When the name resolution mechanism is used, it is possible to provide a resource management method that allows and handles local names which are local for each context for the resources of the distributed system by managing the resources, names and contexts which can interpret the local names. At this time, the resource management method has the only name resolution function for the system as a whole for converting the final context to a resource identifier by causing the names to be applied to the context, performing resolution of the names and conducting resolution recurrently. The mechanism for the name resolution function is a context having a function for name conversion which references a table using as keys name analysis which analyzes the first name and produces a second name, and this second name, and produces a combination of the second context and the third name, and causes the process to move to the second context.

In the above resource management method, it is possible to introduce rules with a plurality of names in the system because a characteristic name analysis function and name conversion function are maintained in each context. Accordingly, it is possible to provide a local yet flexible name space in each context by preparing a plurality of contexts in accordance with the applications and needs. However, the name conversion function of the resource management method is restricted to converting a single name into a single name or a combination of a plurality of names, and consequently, reference is not made to a method which converts for each context the actions which are executed with respect to the manipulation of resources indicated by the third name and the second context. In order to convert this kind of action which is executed with respect to the manipulation of resources for each context, it is acceptable to convert the name resolution mechanism for each context, but the name resolution mechanism for the resource management method cannot change the action of the resources for each context because a common name resolution function is used for the entire system.

In addition, in this document reference is made to the name resolution mechanism extending so as to resolve the first name into a set composed of a plurality of identifiers. With this name resolution mechanism, the explanation is such that the first name corresponds to a group of a plurality of names of another context, and for example uses broadcast communication and the same operation is applied to a plurality of identifiers. However, with this name resolution mechanism, the operation for the first name cannot be realized through the combination of differing operations for a plurality of identifiers resolved by the name resolution mechanism, and reference is not made to the setup which gives concrete expression to this kind of mechanism.

The name management method which is disclosed in Japanese Laid-Open Patent Publication 5-216799 is a management method for creating a correspondence by automatically converting a name in a particular name space into a name of another name space while avoiding overlapping of names. This name management method is fundamentally based on the same mechanism as the above-described name resolution mechanism of Douglas E. Comer and Larry L. Peterson, and has the same problems.

The large-scale distributed computing system connecting method which forms a tiered structure disclosed in Japanese Laid-Open Patent Publication 5-189389 refers to a management method for the identifiers of objects which are comprised from the identifiers of objects in a local name space which achieves a tiered structure to the identifiers of objects in another local name space. This management method of the identifiers of objects is also fundamentally based on the same mechanism as the above-described name resolution mechanism of Douglas E. Comer and Larry L. Peterson, and has the same problems.

The system and method for a linked nomenclature system which can distribute compound names that are composed of names through a plurality of different types of nomenclature systems disclosed in Japanese Laid-Open Patent Publication 5-274274 refers to a system and method in which names are resolved by linking a plurality of differing types of nomenclature systems. This system and method are also fundamentally based on the same mechanism as the above-described name resolution mechanism of Douglas E. Comer and Larry L. Peterson, and have the same problems because nothing more than an explanation of the interface and method of dividing the names by linking the differing nomenclature systems is provided.

The name resolution system which is disclosed in Japanese Laid-Open Patent Publication 5-342134 makes reference to a name resolution system which runs so as to resolve the names into directories which have been duplicated when the duplicate of a directory determined as the result of name resolution is automatically created or deleted and the duplicate exists, depending on the degree of reliability which is stipulated by a parameter and a parameter setting means that stipulates reliability. This system and method are also fundamentally based on the same mechanism as the above-described name resolution mechanism of Douglas E. Comer and Larry L. Peterson, and have the same problems because nothing more is provided than an explanation of a name resolution system which creates duplicates of directories automatically through parameters provided by the user, and which, when duplicates exist, acts so as to accomplish name resolution in self-nodes without requesting resolution from other contexts.

In addition, none of the above-described resource management methods refers to a mechanism which provides, as context, resources which express groups the members of which are all or a portion of the names which that context can resolve. Because this mechanism is lacking, it is impossible to realize locally group resources having the desired members by setting the context which has as the names which can be resolved the members the user intends.

Further, none of the resource management systems or resource management methods which use the above-described name service system or name resolution mechanism refers to a resource management method which accomplishes naming of resources that reflect the intentions of the user on the basis of naming rules that differ for each context and provides local resources on the basis of realization rules in which the actions of the resources differ for each context, and through this enables the realization of local resources having local names which stipulate the realization of resources and resource groups having the properties the individual users desire.

In addition, no reference is made to a resource management method which provides local resources on the basis of realization rules in which the actions of the resources are determined from the actions of a plurality of resources in each context, and which through this enables the realization of local resources having local names in which the determination of resources and resource groups having the properties the individual users desire is possible with a high degree of freedom.

In addition, no reference is made to a resource management method which enables the realization of local group resources having local names in which the members are all or a portion of the names which can be resolved by the context.

Systems which utilize the above-described conventional resource management methods or other conventional resource management systems can be classified as:

(a) systems which utilize resource management systems or a resource management system which manage the names of the resources and the physical position information of the resources using a resource management table or resource management database and outputs the physical position information of the resources in correspondence from the names of the resources which have been input;
 (b) systems which utilize resource management methods having a solitary name resolution mechanism which in order to attain a single context, handles converted names by interpreting the names of the resources, and repeating one or more times the conversion of the names to a single conversion name by straddling the plurality of contexts and the plurality of contexts that output the conversion names of the resources;

(c) systems that utilize resource management methods which in addition to (b) above have a solitary name resolution mechanism which, in order to reach the single context, handles converted names by interpreting the names of the resources, straddling the plurality of contexts and the plurality of contexts that output the converted names of the resources, and repeating one or more times the conversion of the names to a plurality of converted names.

The systems of (a) above manage by creating a correspondence between the first name, which is the name of the first resource, and the identifier of the system that expresses the first resource or a first position which is considered as the identifier at the context, which realizes the first resource. However, this only has a name analyzing means and grammar which interprets names or a solitary naming rule for the entire distributed system. Accordingly, it is impossible to provide a local name space that, besides the first name which is globally determined for the first resource, uses a plurality of differing contexts in accordance with the usage time and needs of the user and the application of use of the first resource, and in addition to the differing naming rules for each context, provides local resources in which the actions differ for each context. Consequently, providing a flexible distributed system which conforms to the desires of various users and usage situations is difficult.

The systems of (b) above have an independent name analyzing means for each context, and consequently it is possible to introduce grammar for a plurality of name interpretations or a plurality of naming rules for names that allow a first resource in the distributed system, and hence it is possible to allow and handle not only a first name for the first resource, but also second and third names, which are independent in the differing contexts in accordance with the name interpretation grammar or the naming rules. Accordingly, it is possible to use a plurality of differing contexts in accordance with the usage application of the first resource, the needs of the user and the usage time, and to provide a plurality of local names which are effective for the respective contexts.

However, with this resource management method, the name resolution mechanism that manages the conversion names which are the result of converting names is not solitary for the distributed system and does not provide a method that changes the management method of conversion names for each context and then provides for each context a local second resource having the desired properties in addition to a first resource corresponding to the first name.

For example, with the first context, the first conversion name and the second context are output to the first name. Next, a predetermined process which is determined by the first context, is executed for the first resource which is provided by the first conversion name and the second context, and the determination of the first name is considered so as to realize locally the second resource which is derived from the first resource having the property the user desires for the first name. However, with this resource management method, it is impossible to provide this type of performance. In addition, for example, with the third context, the first conversion name and the second context are output to the second name. Next, a second predetermined process determined by the third context is executed with respect to the first resource which is provided by the first conversion name and the second context, and the determination of the third name is also considered so as to realize locally the third resource which is output from the first resource having the second property the user desires for the second name. This kind of performance cannot be provided either.

That is, with the systems of (b) above, it is possible to provide local names to the context as a first name and a third name for the first resource by using the first context and the third context, but a function which provides the local realization of resources such as the second and third resources which have the properties desired by the individual users while being derived from the first resource is not provided.

With the systems of (c), in addition to (b) a correspondence is provided to another plurality of resources as the result of the name resolution for the names allowed in the first resource, but the operation with respect to the first resource can be given a correspondence to a plurality of the same operation through broadcast communication which is represented by multicast communication for the plurality of resources which are the resolution results. Accordingly, the operation with respect to the first resource provides a function in which the same operation is duplicated and applied to the plurality of resources that are the resolution results.

However, with these resource management methods, it is impossible to realize local resources having properties such that processes, in which the resource corresponding to the first name is a plurality of resources and which are applied to resources expressed by the first name can be obtained by executing the differing predetermined processes for the plurality of resources of the plurality of contexts as the results of name resolution, and integrating these results.

For example, with the systems of (c), the first name is developed through a plurality of contexts, a plurality of conversion names X, Y and Z, and predetermined procedures x, y, and z, which are respectively applied to the plurality of resources. It is desirable to provide a name resolution mechanism and resource realization mechanism such that the operation with respect to the first name executes operations with respect to the respective resources corresponding to the conversion names X, Y and Z using procedures x, y and z, and these results are compiled and stored. However, this kind of name resolution mechanism and resource realization mechanism are not provided. Accordingly, it is impossible for individual users to access freely local resources having a fourth local name so that the fourth resource, which the first name expresses, is accessed from a plurality of resources while having the desired properties by executing a predetermined process with respect to the plurality of resources.

In addition, in the systems of (a), (b) and (c) above, a mechanism is not provided such that the context itself acts as a group resource having as members all or a portion of the set of names which the context can interpret, and consequently, a group resource is not formed, which has as members all or part of the set, even if a context which reflects the desires of the user is created by stipulating the set of names which the context can interpret.

To summarize the foregoing, with the conventionally known resource management methods, it is possible to provide a function which allows and globally handles global names with respect to resources which are locally managed; which provides a plurality of names determined for each context with respect to predetermined resources and groups; and which handles the names as local names for each context. However, it is impossible to provide a function which stipulates resources having differing actions for each context such that predetermined processes are enacted for global resources and which allows local names on the basis of naming rules that differ for each context. In addition, it is impossible to provide a function which executes respectively differing processes for a plurality of resources and also handles these processes as though a local resource exists which has a single local name with the properties desired by the individual users by compiling these results. In addition, it is impossible to provide a mechanism which acts as a group resource having as members all or a portion of the set of names which the context can interpret. As a result, it is troublesome to give concrete expression to a distributed system with high flexibility which provides a name space for local resource access for each user which reflects the intentions and the preferences of the access methods of the individual users.

As noted above, the name resolution in a conventional resource management system resolves different names or addresses from names which are input using a database for conversion or a conversion table that determines the actions of the context. With this type of system, the moving of context is accomplished by duplicating the conversion table and the database used for conversion. The duplicated conversion table is set so that the context is used in name resolution, and through this it is possible to realize easily at the destination of moving a context that makes the context that is the origin of moving and the action the same.

For example, in the above-described NIS, calling the context that is the destination of moving A and that which is the origin of moving B, ypserv is caused to act by A and B, and the conversion table and the database used for conversion that determines the name resolution are operated by duplication from A to B. Between A and B, a tool is provided which sends and receives the conversion table which is called a map via a network in a specific order. In a resource management system that uses a method of name resolution that resolves the input name into another name using a conversion table and database used for conversion, a function is not provided that customizes the actions of name resolution of the context and customizes the resources indicated after resolution and the properties of the resources or the attributes of the resources and resources under the circumstances of the user at the move destination of the context with a method that moves the context by duplicating the conversion table and database used for conversion.

For example, because the conversion table and database used for conversion are merely copied, in addition to knowing the actions and format of the database and conversion table in order to customize the action of resolution through the information on the side that was moved, it is necessary to alter these, and hence, customization was not simple. In addition, there is not function to combine the database which has been moved and the conversion table and database which B had beforehand.

With the above-described name management method, which is disclosed in Japanese Laid-Open Patent Publication 5-216799, when the database which has been moved and the conversion table and database which B had beforehand are combined, the conversion table and database that is used for conversion are maintained without contradiction so as to avoid overlapping of names, but the means which avoids overlapping is not one which is freely selected by B, and consequently, a customized function in accordance with the circumstances of B is not provided.

In addition, none of the systems have a function that customizes through the circumstances on the side to which the attributes the resource has have been moved and the data format in which the resources corresponding to the name that is to be resolved are input and output, nor do these systems include a conversion table or database, and consequently, this type of customization is difficult.

In addition, even in the above-described system for linked nomenclature systems disclosed in Japanese Laid-Open Patent Publication 5-274274, clarification is not provided for moving of an arbitrary nomenclature system and a structure which alters the action of the nomenclature system in conjunction with the circumstances of the move destination when linking a low cost nomenclature system which existed prior to the move with the nomenclature system which was moved in the move destination after the move has been accomplished.

With the conventional technology, the management method is one which accomplishes correspondences of names and in which the names of a particular name space are automatically converted into the names of another name space while avoiding overlapping of names. With this method, when the conversion table and database which B had beforehand and the database which has been moved are combined, the conversion table and database used for conversion are maintained without contradiction so as to avoid overlapping of names, but because the means for avoiding overlapping is not one which is freely selected by B, a function customized in accordance with the circumstances of B is not provided. Clarification is also not provided for a moving method for contexts used to incorporate a method for interpreting names relating to an arbitrary context and a method for name resolution by duplicating, converting or moving, and customizing to a name system for the duplication destination or move destination.

In this way, a system which utilizes the conventional method of moving the context does not provide a means for moving the context from user A which is the move origin to user B which is the move destination or a function which combines after the move, in the form desired by user B, the context which B had beforehand and the context moved from A. This can be thought of as B duplicating and acquiring from A the context which provides the name space already designed by A, and merging this into the name space of B. In doing this, it is difficult to avoid the overlapping of the names with the method determined by B under the circumstances of B and to incorporate into the name space of B the resource indicated after the name has been resolved by customizing the name space duplicated from A so as to indicate an equivalent other resources, for example a replica in which the contents are maintained the same as in the original with a predetermined format. Consequently, having the context in common among a plurality of users and reuse and distribution of the context such as by duplicating, switching and customizing is difficult.

SUMMARY OF THE INVENTION

In consideration of the foregoing, it is an objective of the invention to provide a resource management system that provides a function for handling local resources having local names with the properties desired by various individual users through executing predetermined processes on global resources. It is also an objective of the invention to provide a resource management system that provides a function for handling resources such that differing processes are executed on a plurality of resources, the results are compiled, and the local resources having a single local name with properties desired by the individual users exist so as to give concrete expression to a distributed system having high flexibility and providing name spaces for local resource access to each user reflecting the desires and preferences of the access methods of the individual users.

In addition, it is an objective of the invention to provide a resource management system that can both realize and utilize a name space by moving the name space which is managed by another resource management system, even in a resource management system that does not have the desired name spaces, and through this to provide a resource management system which is more compact and has greater flexibility.

Further, it is an objective of the invention to provide a resource management system that can disseminate a method of composing a virtual resource in which the resource is easy to use and customized by duplicating, switching and moving between users context that customizes the resources accessed by the individual users, and a method of composing a virtual resource through incorporation into the context procedures that accomplish data processing of the resources which have already been given concrete expression.

As is clear from the above explanation, with the invention, it is possible to provide a function for handling local resources having local names with the properties desired by various individual users through executing predetermined processes on global resources. In addition, it is possible to provide a function for handling resources so that differing processes are executed on a plurality of resources, the results are compiled, and the local resources having a single local name with properties desired by the individual users exist. Through this, concrete expression can be given to a distributed system having high flexibility and providing name spaces for local resource access to each user reflecting the desires and preferences of the access methods of the individual users.

Further, for resource management system in which name space does not exist for local resource access for each user, it is possible to create the name space by transferring the name space from a resource management system that manages the name space so that each resource management system may handle the resources through local names by receiving and delivering the appropriately necessary name spaces without it being necessary to manage all of the name spaces, so that a more compact resource management system is provided and correspondence is made to a distributed system having higher flexibility. The receiving and delivering of name spaces can also be accomplished via a medium, in addition to being accomplished via a network.

Furthermore, the context that provides the name space can be customized in accordance with the circumstances of the transfer destination at the time of transfer. As a result, it is possible to provide a name space which is easy for the user at the transfer destination to use, and various results are achieved such as it being possible to increase the reusability of the context.

BRIEF DESCRIPTION OF THE DRAWINGS

These and other aspects and advantages of the invention will become apparent from the following detailed description of preferred embodiments when taken in conjunction with the accompanying drawings, in which:

FIGS. 4(A) and 4(B) are examples of context search expressions in an example of an action that conducts extraction of context in the first embodiment of the resource management system of the invention;

FIGS. 5(A), 5(B) and 5(C) are an example of a context expression created in an example of an action that conducts extraction of context in the first embodiment of the resource management system of the invention;

FIG. 6 is an example of an action that conducts name resolution in the first embodiment of the resource management system of the invention;

FIGS. 9(A) and 9(B) are examples of context search expressions in an example of an action that conducts extraction of context in the second embodiment of the resource management system of the invention;

FIGS. 10(A), 10(B) and 10(C) are an example of a context expression in an example of an action that conducts extraction of context in the second embodiment of the resource management system of the invention;

FIG. 20 is a name conversion table of context-1;

FIG. 21 is a name conversion table of context-2;

FIG. 22 is an example of search results obtained from the database "Index";

FIG. 23 shows context-1 which is recorded on the medium;

FIG. 24 shows context-2 which is recorded on the medium;

FIG. 26 is a name conversion table of context-3;

FIG. 27 is a name conversion table of context-1'; and

DETAILED DESCRIPTION OF PREFERRED EMBODIMENTS

Figure 1:
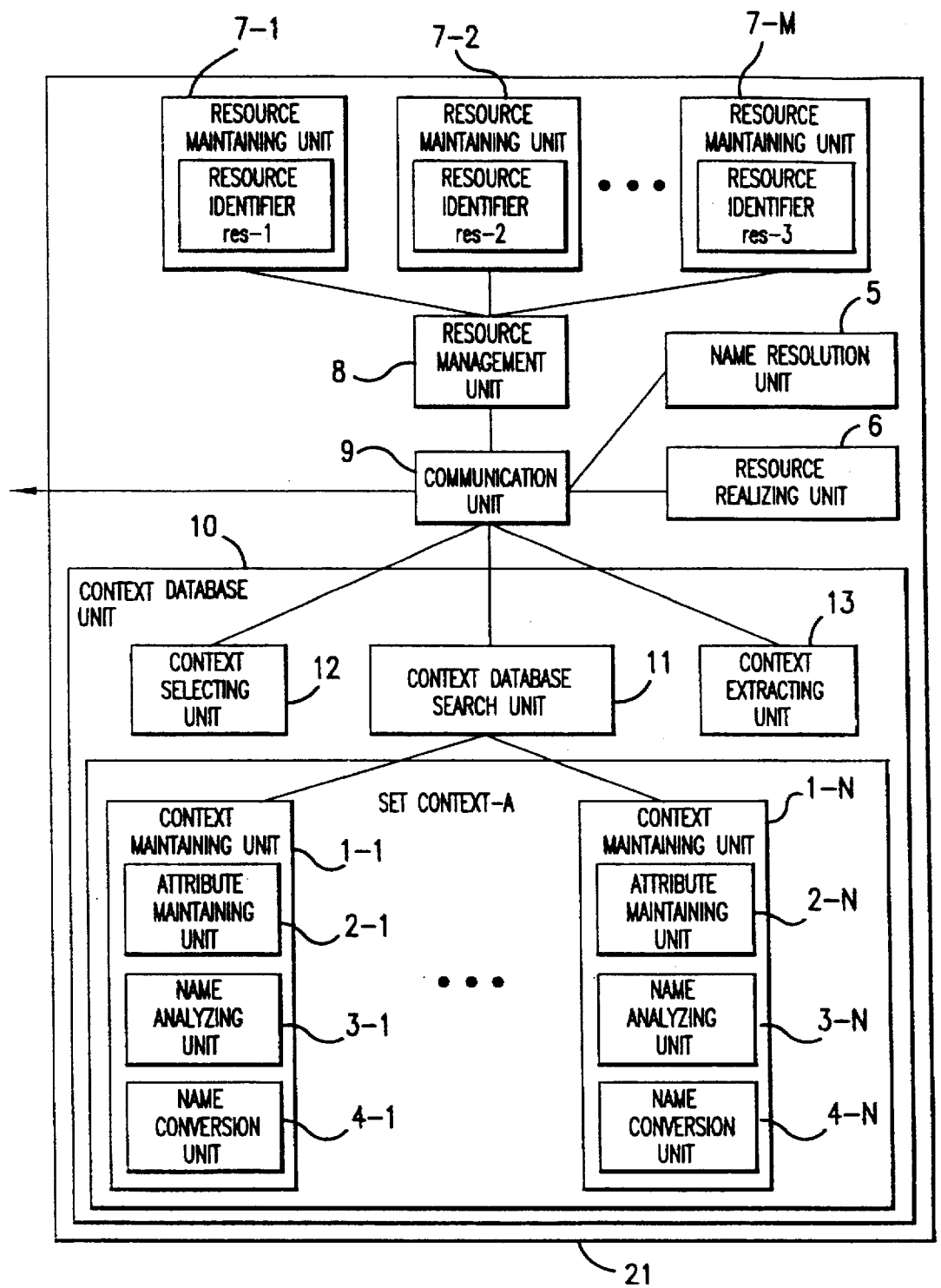
FIG. 1 is a block diagram illustrating a first embodiment of the resource management system of the invention.

While the invention will hereinafter be described in connection with preferred embodiments thereof, it will be understood that it is not intended to limit the invention to those embodiments. On the contrary, it is intended to cover all alternatives, modifications and equivalents that may be included within the spirit and scope of the invention as defined by the appended claims.

For a general understanding of the features of the invention, reference is made to the drawings. In the drawings, like reference numerals have been used throughout to designate like elements.

In the embodiments described hereafter, a management method is disclosed for resources that is capable of handling, as local resources for individual users, resources having the properties desired by the individual users. The resources are those handled by a plurality of computer systems that perform information processing distributively and are arranged in a network, and which are handled by computer systems that locally or globally manage for each individual computer system. The embodiments include explanations of actions when file systems, in particular groups and files which are represented by directories, are localized for each user as resources. The resources are not limited to the files and groups of file systems. For example, the resources may also be hypertext documents represented by grammar which is well-known as HTML (Hyper Text Markup Language) which is an extension of SGML (ISO8879: Standard Generalized Markup Language).

In general, the resource management method of the invention may also handle resources in which a name is given. A handle can be obtained for the name to which an operation of the resource represented by the name can be applied in computer systems, such as hosts, memories, files, groups, ports, processes, users, databases or the like. For example, the operation for the file resource may be file operations such as to open, read, write and close the file. However, these exemplary operations are merely illustrative and not intended to be limiting. The operation may be a portion of these operations or may be capable of seeking.

The operation for a group resource may be a member display. It may also be a member addition or member removal. In addition, the operation for HTML may be capable of any of the operations stipulated by the protocol commonly known as HTTP (Hyper Text Transfer Protocol).

The handle may be the file ID obtained by opening the file, for example, in the case of file resources, but it may also be a pointer to the file structure that houses the attributes of the opened file. In addition, the handle may also be a pointer to the socket structure or socket ID to which the operation for the file can be applied. In general, anything is acceptable if it is a means for applying an operation to the resource.

The embodiments hereafter provide management methods for resources which are single processes for single computer systems, but a single process is not mandatory. In general, the management method for resources in the invention may be a plurality of processes that mutually accomplish communication on a single or a plurality of computer systems.

In addition, the embodiments hereafter provide management methods for resources which are accomplished through the use of procedure orientation, but procedure orientation is not mandatory. The methods may also be accomplished through the use object orientation. In general, the resource management methods of the invention may use any methods including procedure orientation or object orientation.

Further, in the embodiments hereafter, a management method is provided for resources in which communication is provided by means of message communication using ports. However, the use of message communication using ports is not mandatory. In general, any communication between processes including remote programs, remote procedures, sockets, or shared memory may be employed in the management methods of the invention.

Figure 2:
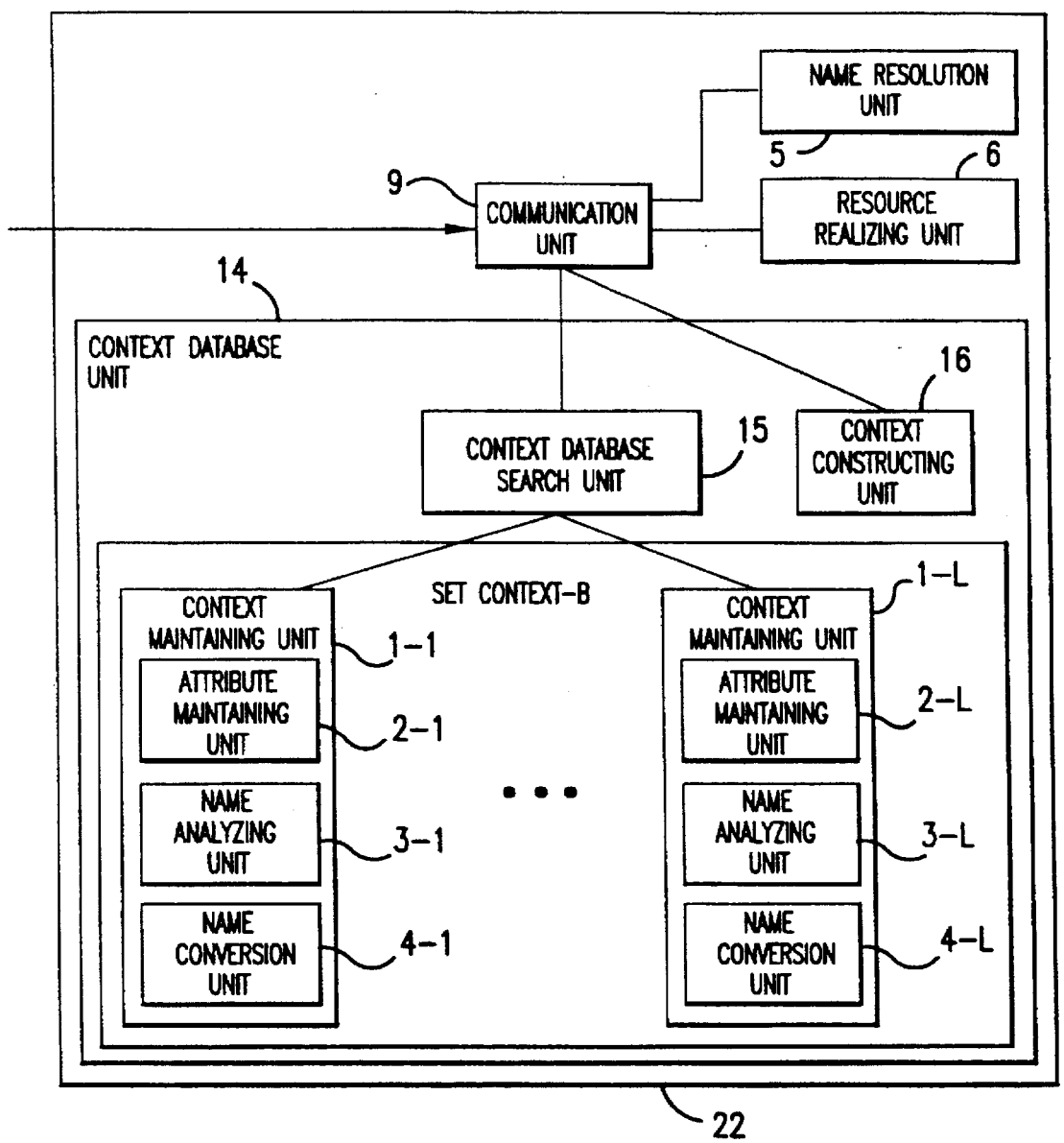
FIG. 2 is a block diagram illustrating a second resource management system in the first embodiment of the resource management system of the invention.

FIG. 1 and FIG. 2 are block diagrams illustrating a first embodiment of the resource management system of the invention. In these drawings, reference numbers 1-i designate context maintaining units, reference numbers 2-i designate attribute maintaining units, reference numbers 3-i designate name analyzing units, reference numbers 4-i designate name conversion units, reference number 5 designates a name resolution unit, reference number 6 designates a resource realizing unit, reference numbers 7-i designate resource maintaining units, reference number 8 designates a resource management unit, reference number 9 designates a communication unit, reference numbers 10 and 14 designate context database units, reference numbers 11 and 15 designate context database search units, reference number 12 designates a context selecting unit, reference number 13 designates a context extracting unit, reference number 16 designates a context constructing unit and reference numbers 21 and 22 designate resource management systems. First, the resource management system 21 shown in FIG. 1 will be described.

In the context maintaining units 1-1 to 1-N, attribute maintaining units 2-1 to 2-N, name analyzing units 3-1 to 3-N and name conversion units 4-1 to 4-N are respectively provided. In the attribute maintaining units 2-1 to 2-N, an arbitrary number of attributes attached to the context maintaining units 1-1 to 1-N, respectively, are maintained as a list of pairs of attribute names and attribute values.

The name analyzing units 3-1 to 3-N respectively analyze the names of input resources. In general, the name analyzing units may be units that accomplish syntax analysis and word analysis in formal language theory and output the analysis results. For example, the units may use regular expressions in formal language theory in word analysis, and may use LR pursers or LALR pursers to perform syntax analysis on tokens which are the results of word analysis on the basis of context free grammar in formal language theory.

The name conversion units 4-1 to 4-N respectively receive the results which have been analyzed by the name analyzing units 3-1 to 3-N and convert the analysis results into first or second resource realization expressions. The first resource realization expression is formed of two first resource element strings, one containing resource search expressions as elements and the other containing procedure information used to process the first resource element strings. The resource search expressions, are search expressions used to stipulate the real resources previously input into the computer system. The second resource realization expression is formed of two second resource element columns, one containing as elements the combinations of context search expressions and resource names, and the other containing procedure information used to process the second resource element strings. The first or second resource realization expression, which has been converted, is output to the name resolution unit 5.

The name resolution unit 5 receives the first or second resource realization expression corresponding to the name of the resource, which the context maintaining units 1-1 to 1-N output, and outputs the resource name from the one of the second resource element strings included in the second resource realization expression to the context maintaining unit which has been searched on the basis of the context search expressions by the context database search unit 11. To the context maintaining unit that output the resource name, the first or second resource realization expression is returned. In this way, the first resource realization expression is obtained by applying the context maintaining units in series. The name resolution results corresponding to all or any of the first resource realization expressions which have been obtained are output to the resource realizing unit 6.

The name resolution results output from the name resolution unit 5 are input into the resource realizing unit 6, which outputs the handles of the resources corresponding to the name resolution results. Thus, a user can access and apply processes to the virtual resources corresponding to the local resource names input by using the handles output from the resource realizing unit 6.

The resource maintaining units 7-1 to 7-M respectively maintain the resources previously accessed, and resource identifiers res-1 to res-M are also provided.

The resource management unit 8 manages the resources which the resource maintaining units 7-1 to 7-M maintain globally or locally in a specific computer system, and specify the resources previously accessed in accordance with the resource search expressions.

The communication unit 9 allows communication between the name resolution unit 5, the resource realizing unit 6, the resource management unit 8 and the context database unit 10. The communication unit 9 also allows communication with other resource management systems, and upon receiving context search expressions used to accomplish extraction of context sets, delivers the context search expressions to the context selecting unit 12 in the context database unit 10 and transfers the context expression which has been coded by the context extracting unit 13.

The context database unit 10 manages the N context maintaining units 1-1 to 1-N as a context set. The context database unit 10 in general manages the set, attaches names to the set, and references the set using the names of the set. In FIG. 1, the context set is called set "Context-A". When there is only 1 unit, it may be referenced without attaching a name.

The context database unit 10 also contains the context database search unit 11, the context selecting unit 12 and the context extracting unit 13. The context database search unit 11 receives context search equations, which are described using attributes, and searches for the context maintaining unit which has the attributes that satisfy the context search equation from the context set. The search results can be output for example as the set of references corresponding to the context maintaining unit.

When a context search expression for use in accomplishing the extraction of a context set is input into the communication unit 9, the context selecting unit 12 delivers the context search expression to the context database search unit 11, obtains the set of context maintaining units that satisfy the context search expression, and outputs the set to the context extracting unit 13.

The set of references corresponding to the context maintaining units is input into the context extracting unit 13, which outputs, as the context expression, information necessary to create the set of context maintaining units equivalent to the context maintaining units indicated by the references. In general, the format of the context expression may use any kind of language. For example, the format may be a binary type format that reads out, in increasing order of address, the memory region of the memory or the like which the context maintaining unit occupies, an S-type expression which is used widely in list format expressions, a normal expression, or a format on the basis of the grammar of a particular program language. In the explanation hereafter, one example that uses an S-type expression is shown as an example.

Next, the resource management system 22 shown in FIG. 2 will be described. The system 22 includes name resolution unit 5, resource realizing unit 6, communication unit 9 and context database unit 14. The name resolution unit 5 and the resource realizing unit 6 are the same as in the above-described resource management system 21.

The communication unit allows communication between the name resolution unit 5, the resource realizing unit 6 and the context database unit 14. In addition, the communication unit 9 allows communication with the other resource management systems, and in particular, allows a process that delivers to the context constructing unit 15 the context expression received from the other resource management systems.

The context database unit 14 manages the L context maintaining units 1-1 to 1-L as a context set. The context database unit 14 in general manages the set of an arbitrary number of contexts, attaches names to the set and makes references. In FIG. 2, the context set is called set "Context-B". When there is only one unit, it may be referenced without attaching a name. The context maintaining units 1-1 to 1-L have the same structure as in the above-described resource management system 21.

In the context database unit 14, a context database search unit 15 and a context constructing unit 16 are provided. The context constructing unit 16 creates the context maintaining unit and delivers it to the context database search unit 15 in accordance with the context expression received by the communication unit 9. The context database search unit 15 receives the context search expression which is described using attributes, and searches for the context maintaining units which have attributes satisfying the context search expression from the context set. The search results can be output, for example, as a set of references to the context maintaining units. In addition, recording processes for the context maintaining units which are created by the context constructing unit 16 are also accomplished.

Figure 3:
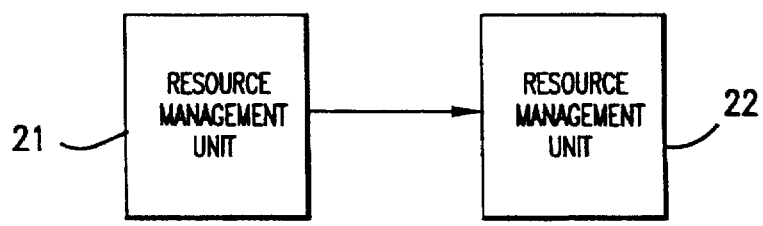
FIG. 3 illustrates a connection of the plurality of resource management systems in the first embodiment of the resource management system of the invention.

Next, one example of the concrete actions in the first embodiment of the resource management system of the invention will be described. FIG. 3 illustrates a connection of a plurality of resource management systems in the first embodiment of the resource management system of the invention. In the explanation hereafter, the resource management system 21 and the resource management system 22 are assumed to be logically connected. In general, the resource management system 21 and the resource management system 21 are formed of a single computer system or a plurality of computer systems and are connected through a network and circuit or the like. Or, the systems are formed of one computer system and are connected through a communication means such as a message mechanism or the like. Each resource management system is capable of communication among the plurality of other resource management systems, but here a one-to-one logical connection is assumed as shown in FIG. 3 for purposes of simplicity.

In the resource management system 21, the three attributes consisting of the attribute "owner" which represents the owner, "mdate" which represents the modification date, and "category" which represents the category are maintained as a list of pairs of attribute names and attribute values. The attribute values can be referenced respectively as property.owner, property.mdate and property.category. For the attribute maintaining unit 2-1, the value of property.owner is "Smith", the value of property.mdate is "95.3.18" and the value of property.category is "picture"; for the attribute maintaining unit 2-2, the value of property.owner is "Smith", the value of property.mdate is "95.11.14" and the value of property.category is "picture"; and for all of the attribute maintaining units 2-3 to 2-N, the value of property.owner is "Bill", the value of property.mdate is "95.3.3" and the value of property.category is "sound".

In addition, the name analyzing unit 3-1 outputs as-is all of the names input thereinto. The procedure, which is performed by the name analyzing unit 3-1 to output the names as-is, is called procedure 3-1. Similarly, the name analyzing unit 3-2 analyzes the characters of the name that has been input starting from the front, divides the characters into "character column 1," which is the character column before the character "." that appears first, and "character column 2", which is the character column after the character "." that appears first, and outputs the two item combination <character column 1, character column 2> of the character column 1 and the character column 2. The procedure for the processes that accomplish analysis of names which are performed by the name analyzing unit 3-2 is called procedure 3-2.

The name conversion unit 4-1 outputs to the name "name1" the resource realization expression <{},{res-1}>. The resource realization expression is formed of a realization element string that is empty and a resource element string that is a resource search expression formed of resource identifier res-1. That is, the resources having resource identifier res-1 can be used as-is, and the resource realization expression is the same as the resource identifier res-1 alone. Consequently, the name conversion unit 4-1 outputs the resource identifier res-1 to the name "name1". The procedure wherein the conversion from the name "name1" to the resource identifier res-1 is performed by the name conversion unit 4-1 is called procedure 4-1. The name conversion performed by the name conversion unit 4-2 is similarly a conversion from the name "name2" to the resource identifier res-2, and the procedure wherein the conversion of the name is performed by the name conversion unit 4-2 is called procedure 4-2.

Further, the name resolution unit 5 outputs as-is all of the input resource search expressions and the resource search expressions in the resource realization expression.

Now consider the case wherein the context that is searched and transferred to the resource management system 22 is such that the attribute value indicating the owner is equivalent to "Smith" out of the contexts which are recorded in the context database 10 of the resource management system 21, while the attribute value indicating the modification date is newer than Mar. 16, 1995 and the attribute value indicating category is "picture".

FIGS. 4(A) and 4(B) are examples of context search expressions in an example of an action that performs extraction of context in the first embodiment of the resource management system of the invention. When a context maintaining unit such as is described above is searched for and the context expression is transferred, it is acceptable to input into the communication unit 9 the context search expression OQL-1-1 such as is shown in FIG. 4(A). The context search expression OQL-1-1 is described as conforming to C++Object Query Language: C++OQL proposed by the Object Database Management Group (ODMG). The context search expression OQL-1-1 represents a request that, from the set Context-A, a context maintaining unit be searched for, in which context maintaining unit the value of the attribute property.owner indicating the owner is equivalent to "Smith", the value of attribute property.mdate indicating the modification date is larger than 95.3.16 and the value of the category attribute property.category is equivalent to "picture", and it requires the set of references to the context maintaining unit to be returned to the variable "subcontext".

In addition, the portion in the double quotations in the third through sixth rows of the context search expression OQL-1-1 shown in FIG. 4(A) is assumed to be context search expression OQL-1-2 for the following explanation. The context search expression OQL-1-2 is shown in FIG. 4(B). The context search expression OQL-1-2 conforms to Object Query Language: OQL proposed by the Object Database Management Group (ODMG). In general, any object search expression may be used as the context search expression.

When the request arrives that accomplishes extraction of the context set stipulating the context search expression OQL-1-1 in the communication unit 9 of the resource management system 21, the communication unit 9 receives it and makes a request to the context selecting unit 12 so that a context maintaining unit that satisfies the context search expression OQL-1-1 is searched for from among each of the context maintaining units 1-1 to 1-N.

The context selecting unit 12 delivers the context search expression OQL-1-2 to the context database search unit 11 and searches for a context maintaining unit having in the attribute maintaining unit attributes satisfying the context search expression OQL-1-2. In this case, because only the context maintaining unit 1-1 and the context attribute maintaining unit 1-2 satisfy the conditions of the context search expression OQL-1-2, the context database search unit 11 returns the set formed of a reference for the context maintaining unit 1-1 and a reference for the context maintaining unit 1-2 to the context selecting unit 12 as the search results of the context search expression OQL-1-2.

The context selecting unit 12, which receives the set formed of a reference for the context maintaining unit 1-1 and a reference for the context maintaining unit 1-2, inputs the set into the context extracting unit 13 and requests that the context maintaining units pertinent to the references be picked out.

The context extracting unit 13 codes the contents of the context maintaining units that correspond to the various references that are the elements of the set received from the context selecting unit 12, creates a context expression and delivers it to the communication unit 9. FIGS. 5(A), 5(B) and 5(C) are an example of a context expression created in an example of an action that accomplishes extraction of context in the first embodiment of the resource management system of the invention. For example, when coding is accomplished using an S-type expression, the context maintaining unit 1-1, as shown in FIG. 5(A), and the context maintaining unit 1-2, as shown in FIG. 5(B), are respectively coded. The codes are compiled into a list, and the context expression shown in FIG. 5(C) is transferred to the communication unit 9 of the resource management system 22 from the communication unit 9 of the resource management system 21.

The communication unit 9 of the resource management system 22 receives the context expression from the communication unit 9 of the resource management system 21 outputs the context expression to the context developing unit 16 and requests that a context maintaining unit be created from the context expression.

The context constructing unit 16 creates a context maintaining unit in accordance with the input context expression. In this example, the context maintaining unit 1-1 and the context maintaining unit 1-2 are coded in the resource management system 21, and are converted into the context expression, and consequently, in the context constructing unit 16, a context maintaining unit 1-L+1 and a context maintaining unit 1-L+2 are created which are equivalent to the context maintaining unit 1-1 and the context maintaining unit 1-2 of the resource management system 21.

The newly created context maintaining unit 1-L+1 comprises an attribute maintaining unit 2-L+1, a name analyzing unit 3-L+1 and a name conversion unit 4-L+1. For the attribute maintaining unit 2-L+1, the value of the attribute property.owner is "Smith", the value of the attribute property.mdate is 95.3.18, and the value of the attribute property.category is "picture". The name analyzing unit 3-L+1 outputs as-is all of the names which have been input. The name conversion unit 4-L+1 outputs res-1 to the name "name1".

In addition, the newly formed context maintaining unit 1-L+2 comprises an attribute maintaining unit 2-L+2, a name analyzing unit 3-L+2 and a name conversion unit 4-L+2. For the attribute maintaining unit 2-L+2, the value of the attribute property.owner is "Smith", the value of the attribute property.mdate is 95.11.14, and the value of the attribute property.category is "picture". The name analyzing unit 3-L+2 analyzes from the start the characters that form the name which has been input, divides these characters into a character column "character column 1" which is in front of the character "." that appears first, and a character column "character column 2" which is after the character "." that appears first, and outputs the two item combination <character column 1, character column 2> of the character column 1 and the character column 2. The name conversion unit 4-L+2 outputs res-2 to the name "name2". The context maintaining units 1-L+1 and 1-L+2 which are created by the context constructing unit 16 are delivered to the context database search unit 15.

In the context database search unit 15, first, context maintaining units are sought which have the same attribute list as the context maintaining unit that was formed by the context constructing unit 16. When a context maintaining unit exists having the same attribute list, the context database search unit 15 deletes the context maintaining unit of the context database, and adds a new context maintaining unit to the context database. In general, when a context maintaining unit already exists having the same attribute list, the context database search unit 15 may delete the existing context maintaining unit and record a new context maintaining unit, may not delete the existing context maintaining unit and not add a new context maintaining unit, or may add a new context maintaining unit without deleting the existing context maintaining unit. Or, the user may stipulate beforehand which of the above-described actions to select, or a query of the user may be made as to which of the above-described actions to select.

Next, consider the case in the resource management system 22 wherein the context expression is transferred as described above, and after being recorded in the context database unit 14, a context is stipulated such that the attribute value representing owner is equivalent to "Smith", the attribute value representing modification date is equivalent to Mar. 18, 1995 and the attribute value representing category is equivalent to "picture", and a query to the name "name1" is performed.

FIG. 6 is an example of context search expressions in an example of an action that performs name resolution in the first embodiment of the resource management system of the invention. When a query such as that described above is performed, a context search expression OQL-1-3 such as that shown in FIG. 6, for example, can be input. The context search expression OQL-1-3 is described in conformity to OQL. The context search expression OQL-1-3 requests that a search be made for a context maintaining unit in which the attribute property.owner representing owner is equivalent to "Smith", the attribute property.mdate representing modification date is equivalent to 95.3.18 and the attribute property.category representing category is equivalent to "picture". As the results of the search, when one relevant context maintaining unit exists, the context maintaining unit is returned, while otherwise an error is returned.

The communication unit 9 of the resource management system 22, upon receiving the query request for the name "name1", which was stipulated by the context search expression OQL-1-3, makes a request to the context database search unit 15 to search for a unit which satisfies the context search expression OQL-1-3 out of the attribute maintaining units 2-1 to 2-L, 2-L+1 and 2-L+2 of the context maintaining units 1-1 to 1-L, 1-L+1 and 1-L+2.

The context database search unit 15 searches for the context maintaining unit having in the attribute maintaining unit the attributes satisfying the context search expression OQL-1-3. Because only the attribute maintaining unit 2-L+1 satisfies the conditions of the context search expression OQL-1-3, the context database search unit 15 returns the reference for the context maintaining unit 1-L+1 as the search results of the context search expression OQL-1-3.

The communication unit 9 inputs the name "name 1" into the context maintaining unit 1-L+1 and requests a name resolution process. The context maintaining unit 1-L+1 inputs the name "name1" into the name analysis unit 3-L+1 and makes a request so that analysis of the name is performed. The name "name1", which was input into the name analysis unit 3-L+1, is output as-is as the name "name1", and the name "name1" becomes the input of the name conversion unit 4-L+1. The name conversion unit 4-L+1 outputs the identifier res-1 with respect to the name "name1".

The resource identifier res-1, which was input into the name resolution unit 5 of the resource management system 22, is output as-is, and the identifier res-1 is obtained as the result of resolution of the name "name1" which stipulated the context search expressions OQL-1-3 in the communication unit 9. From the resource realization expression, a resource maintained by the resource maintaining unit 7-1 of the resource management system 21 having the resource identifier res-1 is obtained by the resource realizing unit 6 via the communication unit 9 of the resource management system 21 and the communication unit 9 of the resource management unit 22.

In this way, in the resource management system 22 which did not have the context maintaining unit that resolved the name "name1", the context expression necessary to create the context maintaining unit is received from the resource management system 21 and the context maintaining unit is created, and through resolution of the name "name1" it becomes possible to resolve the name "name1" in the resource management system 22.

Naturally, by requesting resolution of the name "name1" in the communication unit 9 of the resource management system 21, it is possible to obtain a resource corresponding to the name "name1" in the resource management system 21. The process and procedures at this time are the same as the above-described procedures for resolution of names in the resource management system 22, and it is possible to obtain resources of the resource maintaining units 7-1 to 7-M managed by the resource management unit 8 through the name resolution unit 5 and the resource realizing unit 6 on the basis of the first resource realization expression output from the name conversion unit of the context maintaining unit.

Figure 7:
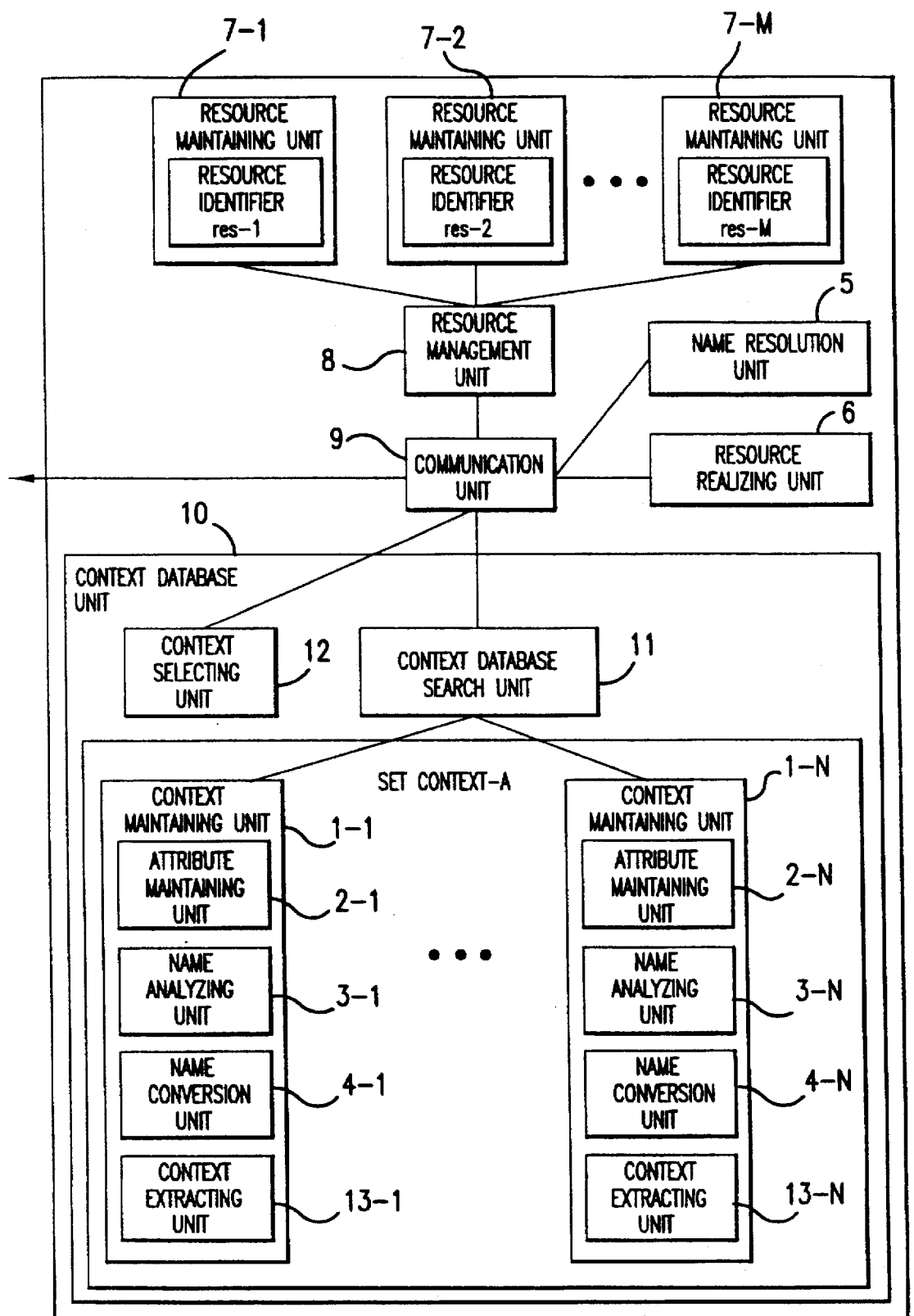
FIG. 7 is a block diagram illustrating a first resource management system 21 in a second embodiment of the resource management system of the invention.
Figure 8:
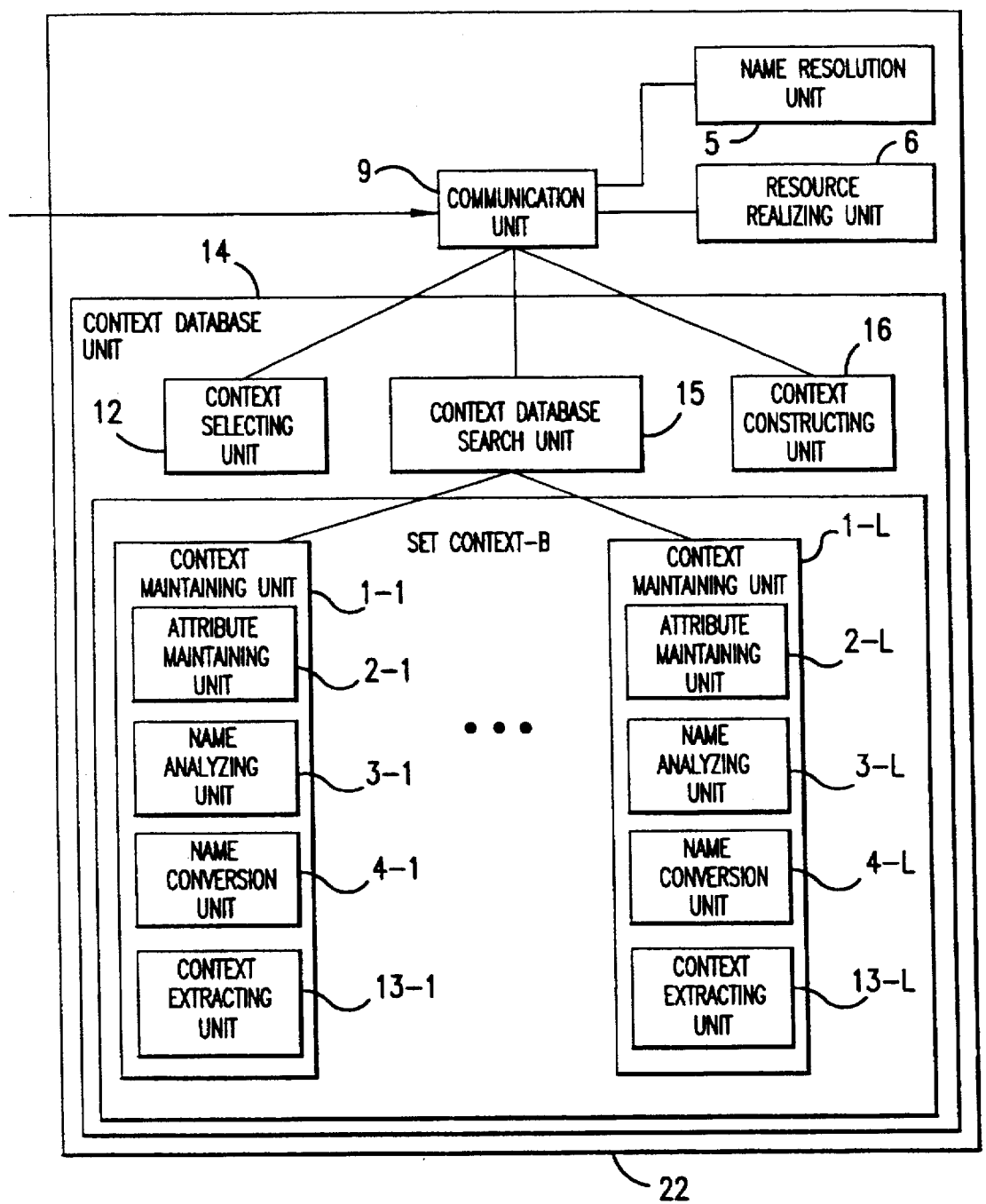
FIG. 8 is a block diagram illustrating a second resource management system 22 in the second embodiment of the resource management system of the invention.

FIG. 7 and FIG. 8 are block diagrams illustrating a second embodiment of the resource management system of the invention. In FIGS. 7 and 8, components and parts which are the same as components and parts in FIG. 1 are labeled with the same reference numbers and the explanation of such components and parts is omitted here. Reference numbers 13-i designate context extracting units. In the second embodiment, context extracting units are provided in each context maintaining unit. The resource management system shown in FIG. 7 will be described first.

In the context maintaining units 1-1 to 1-N, attribute maintaining units 2-1 to 2-N, name analyzing units 3-1 to 3-N, name conversion units 4-1 to 4-N and context extracting units 13-1 to 13-N are respectively provided. The context extracting units 13-1 to 13-N output as the context expression the information necessary to create the context maintaining units included in the context extracting units 13-1 to 13-N and equivalent context maintaining units in accordance with requests from the context selecting unit 12.

When the context search expression used to extract the context sets in the communication unit 9 is input, the context selecting unit 12 delivers the context search expression to the context database search unit 11, the set of context maintaining units satisfying the context search expression are obtained, and a request is made so that the contents of the context maintaining units are output to the context extracting unit in each context maintaining unit in the set. In addition, the contents of the context maintaining units which are obtained from each of the context extracting units are delivered to the communication unit 9 as a list.

Next, the resource management system 22 will be described. In the resource management system 22, context extracting units 13-1 to 13-L are included in the context maintaining units 2-1 to 2-L, otherwise the structure is similar to that of the first embodiment shown in FIG. 2.

Next, a description will be given of an example of an action in the second embodiment of the resource management system of the invention. In this example, the resource management system 21 and the resource management system 22 are logically connected, as in above-described first embodiment shown in FIG. 3. Further, the hypothetical conditions of each unit are similar to the example in the above-described first embodiment. The procedure executed by the context extracting unit 13-1 in the resource management system 21 is called procedure 13-1, and the procedure executed by the context extracting unit 13-2 is called procedure 13-2.

Now, consider the case wherein a context maintaining unit, in which the attribute value representing owner is equivalent to "Smith", the attribute value representing modification date is newer than Mar. 16, 1995, and the attribute value representing category is "picture", is searched for from the set Context-A, and the corresponding context expression is transferred to the resource management system 22.

FIGS. 9(A) and 9(B) are an example of context search expressions in an example of an action that performs extraction of context in the second embodiment of the resource management system of the invention. When the above-described extraction of context is accomplished, it is acceptable to input the context search expression OQL-2-1, such as shown in FIG. 9(A), for example, into the communication unit 9 of the resource management system 21. The context search expression OQL-2-1 is described in conformity with C++OQL. The context search expression OQL-2-1 represents a request that a search be made for context maintaining units in which the value of the attribute property.owner representing owner is equivalent to "Smith", the value of the attribute property.mdate representing modification date is larger than 95.3.16, and the value of the category attribute property.category is equivalent to "picture". The set of references to the context maintaining units is returned to the variable "subcontext", the message "extract" is sent for each individual request of the set of the variable "subcontext", and the value in which the results are linked is output to the standard output stream.

In addition, for purposes of explanation, the portion in the double quotations in the third through the sixth columns in the context search expression OQL-2-1, shown in FIG. 9(A), is assumed to be the context search expression OQL-2-2. The context search expression OQL-2-2 is shown in FIG. 9(B). The context search expression OQL-2-2 conforms to OQL.

When the request for extraction of the context set, stipulating the context search expression OQL-2-1 in the communication unit 9 of the resource management system 21, is received by the communication unit 9, it makes a request to the context selecting unit 12 that a unit that satisfies the context search expression OQL-2-1 be searched for from among each of the context maintaining units 1-1 to 1-N.

The context selecting unit 12 delivers the context search expression OQL-2-2 to the context database search unit 11 and searches for a context maintaining unit having in the attribute maintaining unit attributes satisfying the context search expression OQL-2-2. In this case, because only the context maintaining unit 1-1 and the context attribute maintaining unit 1-2 satisfy the conditions of the context search expression OQL-2-2, the context database search unit 11 returns the set formed of a reference to the context maintaining unit 1-1 and a reference to the context maintaining unit 1-2 to the context selecting unit 12 as the search results of the context search expression OQL-2-2.

The context selecting unit 12, which receives the set formed of a reference for the context maintaining unit 1-1 and a reference for the context maintaining unit 1-2, inputs to the context extracting units 13-1 and 13-2 of the context maintaining units 1-1 and 1-2 that the contents of the context maintaining units 1-1 and 1-2 be picked, using the references to the context maintaining units 1-1 and 1-2, which are the elements of the set.

FIGS. 10(A), 10(B) and 10(C) are an example of a context expression in an example of an action that performs extraction of context in the second embodiment of the resource management system of the invention. The context extracting unit 13-1 codes the contents of the context maintaining unit 1-1 in accordance with commands from the context selecting units 12 and outputs a context expression, for example, as shown in FIG. 10(A). Similarly, the context extracting unit 13-2 codes the contents of the context extracting unit 1-2 in accordance with commands from the context selecting unit 12 and outputs a context expression, for example, as shown in FIG. 10(B). In the example shown in FIGS. 10(A), 10(B) and 10(C), an example is shown for the case wherein an S-type expression is used as the expression method of the context expression.

The context selecting unit 12 outputs the outputs to the communication unit 9 as lists, as shown in FIG. 10(C). In this way, the information necessary to create context maintaining units equivalent to context maintaining units 1-1 and 1-2 is transferred from the communication unit of the resource management system 21 to the communication unit 9 of the resource management system 22.

The communication unit 9 of the resource management system 22, which receives the context expression from the communication unit 9 of the resource management system 21, delivers the received context expression to the context constructing unit 16 and makes a request that context maintaining units be formed from the context expression.

The context developing unit 16 creates context maintaining units 1-L+1 and 1-L+2 in accordance with the input context expressions. The context maintaining units 1-L+1 and 1-L+2, which are formed at this time have attribute maintaining units 2-L+1 and 2-L+2, name analyzing units 3-L+1 and 3-L+2 and name conversion units 4-L+1 and 4-L+2 in addition to context extracting units 13-L+1 and 13-L+2.

The context maintaining units 1-L+1 and 1-L+2 are delivered to the context database search unit 15, and are recorded in the context database unit 14 similar to the example explained in the above-described first embodiment. Accordingly, resolution of names is performed in the resource management system 22 similar to the case using the context maintaining units 1-1 and 1-2 in the resource management system 21, and it is possible to obtain the desired resource.

The invention can have various configurations besides the structures shown in the above-described first and second embodiments. For example, in the above-described first and second embodiments, it is also possible to include the name resolution unit 5 in the context maintaining units. In this case, in the procedure of name resolution, it is necessary to form the name resolution unit of each context maintaining unit in such a way that resolution of the second resource realization expression requests the other context maintaining units and the first resource realization expression, which is the result of name resolution, is received. The context database search unit may be configured such that the context maintaining unit of the request destination is searched on the basis of the context search expression in the second resource realization expression and is delivered to the second resource realization expression, which upon receiving the results returns the results to the request origin. Furthermore, it is also possible for the resource realizing unit 6 to be included in the context maintaining units along with the name resolution unit 5.

The structure elements of the context maintaining units are preferably such that a side of a unit which sends the context expression also receives the context expression, but as long as elements are not created which are missed in the resource management system which were received, the sides may differ. For example, it is possible to have a structure such that the sending side of the context maintaining unit has an attribute maintaining unit, a name analyzing unit, a name conversion unit and a name resolution unit, and the receiving side of the context maintaining unit has an attribute maintaining unit, a name analyzing unit and a name conversion unit with a common name resolution unit, a context maintaining unit having the same attribute maintaining unit, name analyzing unit, name conversion unit and name resolution unit on the sending side formed on the receiving side such that the name resolution unit in the context maintaining unit for example is used with priority.

In addition, in the above-described first and second embodiments, a resource management unit 8 and resource maintaining unit 7 are not provided in the resource management system 22; however, these elements may be provided in the resource management system. In this case, it is possible to have a structure such that name resolution is conducted by the resource management system 22 alone to obtain the desired resource. Conversely, it is also possible to have a structure such that a resource realizing unit 6 is not provided and the name resolution result is sent from the name resolution unit to the resource management system that actually manages the resources and requests the realization of the resource.

Further, in the above-described first and second embodiments, it is also possible to have a structure wherein a context constructing unit is also provided in the resource management system 21, and wherein a context selecting unit and context extracting unit are also provided in the resource management system 22 so that the respective resource management systems can perform sending and receiving of context expressions.

Also, in the above-described first and second embodiments, it is possible to create another set within the context database unit through only the context maintaining unit, which was selected by the context selecting unit, and to establish a new name resolution space.

Figure 11:
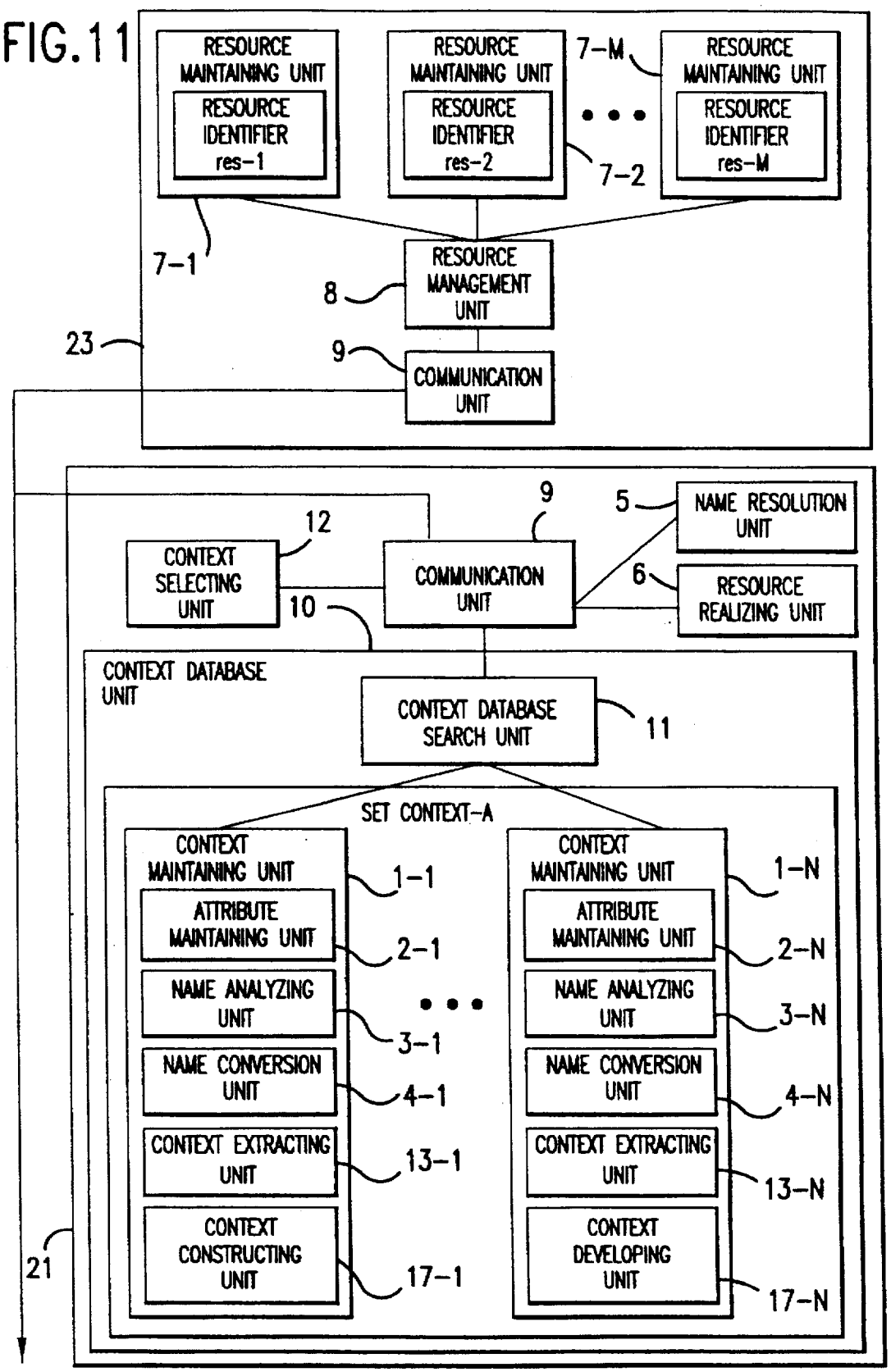
FIG. 11 is a block diagram illustrating first and third resource management systems in a third embodiment of the resource management system of the invention.
Figure 12:
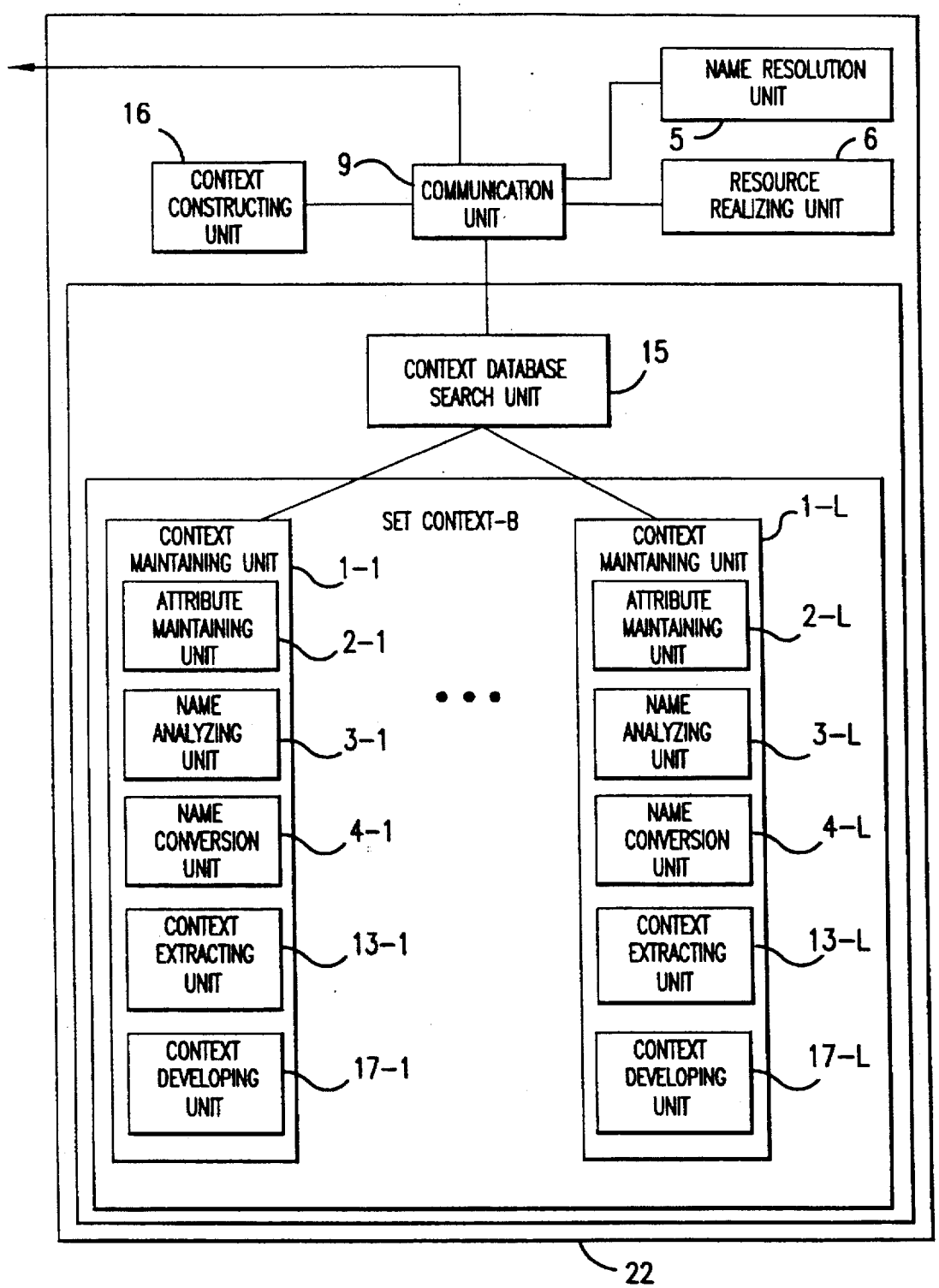
FIG. 12 is a block diagram illustrating a second resource management system in the third embodiment of the resource management system of the invention.

FIG. 11 and FIG. 12 are block diagrams illustrating a third embodiment of the resource management system of the invention. In FIGS. 11 and 12, components and parts which are the same as components and parts in FIG. 7 and FIG. 8 are labeled with the same reference numbers and the explanation of such components and parts is omitted here. Reference numbers 17-1 to 17-N designate context constructing units, reference number 16 designates a common context constructing unit and reference number 23 designates a resource management system. In the above-described first and second embodiments, it is necessary for the formation of the transferred context maintaining units to be interpreted on the side receiving the context maintaining units. In the third embodiment, a context constructing unit is further provided in each context maintaining unit and by developing the context maintaining units through the context constructing units in the context maintaining units, it is possible to perform construction without the side that receives the context maintaining units interpreting the contents of the context maintaining units. First, the resource management system 21 shown in FIG. 11 will be described.

In the context maintaining units 1-1 to 1-N, attribute maintaining units 2-1 to 2-N, name analyzing units 3-1 to 3-N, name conversion units 4-1 to 4-N and context extracting units 13-1 to 13-N are respectively provided along with context constructing units 17-1 to 17-N. The context constructing units 17-1 to 17-N create the same context maintaining units as the context maintaining units 1-1 to 1-N where each is respectively provided.

Next, the resource management system 22 will be described. The common context constructing unit 16 starts the context constructing unit in the context expression sent from the other resource management system. Through this, the context maintaining units are created in a self-developing manner. In addition, the common context constructing unit 16 also customizes the rule for converting names in the name conversion unit of the context maintaining unit, which has been created, in combination with the resource management system 22.

The resource management system 23 illustrates an example of the resource management unit 8 and the resource maintaining units 7-1 to 7-M in the resource management system 21 in FIG. 7 provided on another resource management system.

With the third embodiment, it is possible to have a configuration wherein a plurality of computer systems that accomplish information processing are distributively arranged in a network and, after context is duplicated, which gives concrete expression to local virtual resources having the properties desired by individual users for resources which are previously input locally or globally in each individual computer system, the context is transferred from computer A to computer B, and for the resource which is previously input in the transfer destination, either the virtual resource itself or a new local virtual resource provided with properties which the virtual resource has through customizing is created.

In each of the above-described embodiments, an example was shown wherein the context expression was transferred via a network or the like. However, in order to disseminate the context expression, it is also possible to cause dissemination by not using a network, but rather using, for example, a recording medium capable of being removed from the computer system (hereafter simply called the medium). Hereafter, the transfer of context using the medium will be explained and a description will be given using a file system for customizing of the context shown in the above-described third embodiment. However, the invention is not restricted to a file system, for naturally the same is true for other resources.

Figure 13:
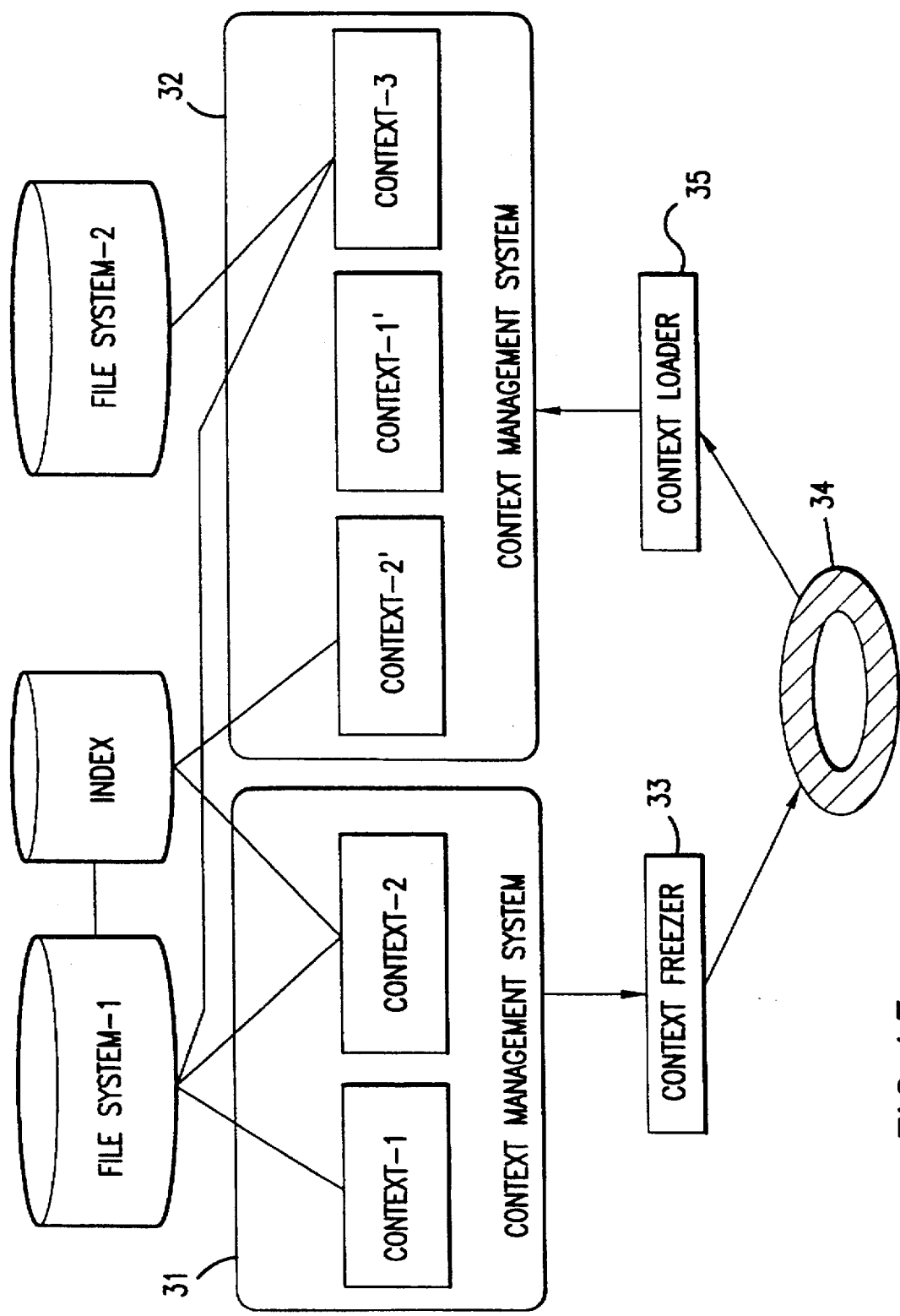
FIG. 13 is a block diagram illustrating a system configured to transfer context using a medium.

FIG. 13 is a block diagram illustrating a system configured to transfer context using a medium. In FIG. 13, reference numbers 31 and 32 designate context management systems, reference number 33 designates a context freezer, reference number 34 designates the medium, and reference number 35 designates a context loader. The context management systems 31 and 32 have and manage one or more context maintaining units (hereafter simply called context). In this example, the context management system 31 has context-1 and context-2, while the context management system 32 has context-1', context-2' and context-3'.

The context freezer 33 picks out the context which has been stipulated from the context management system 31, creates a duplicate of the context, that is, an expression of the context, which has been converted into a form which can be written on the medium 34, and writes the context onto the medium 34.

The context loader 35 picks out the duplicate of the context from the medium 34, customizes the duplicate through commands, restores it so that actions are possible, and stores it in the context management system 32.

In addition, file system-1 and file system-2 are real resources. "Index" is a database created from the file system-1, and can be used to search data in file system-1.

Figure 14:
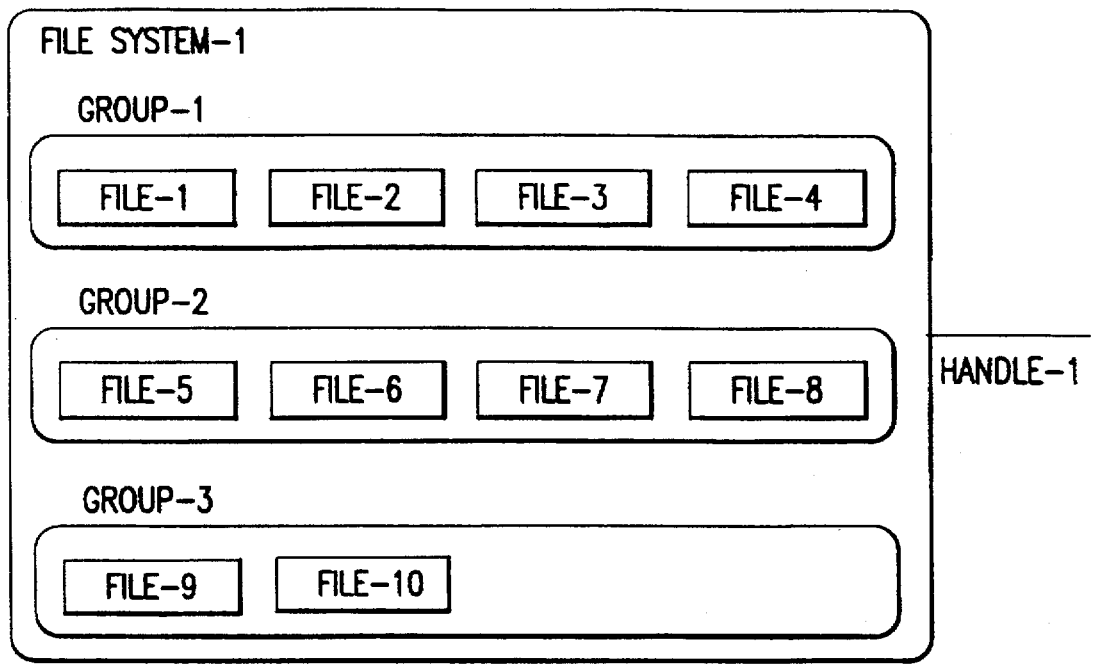
FIG. 14 illustrates an existing resource that is handled by the system configured to use a medium.
Figure 15:
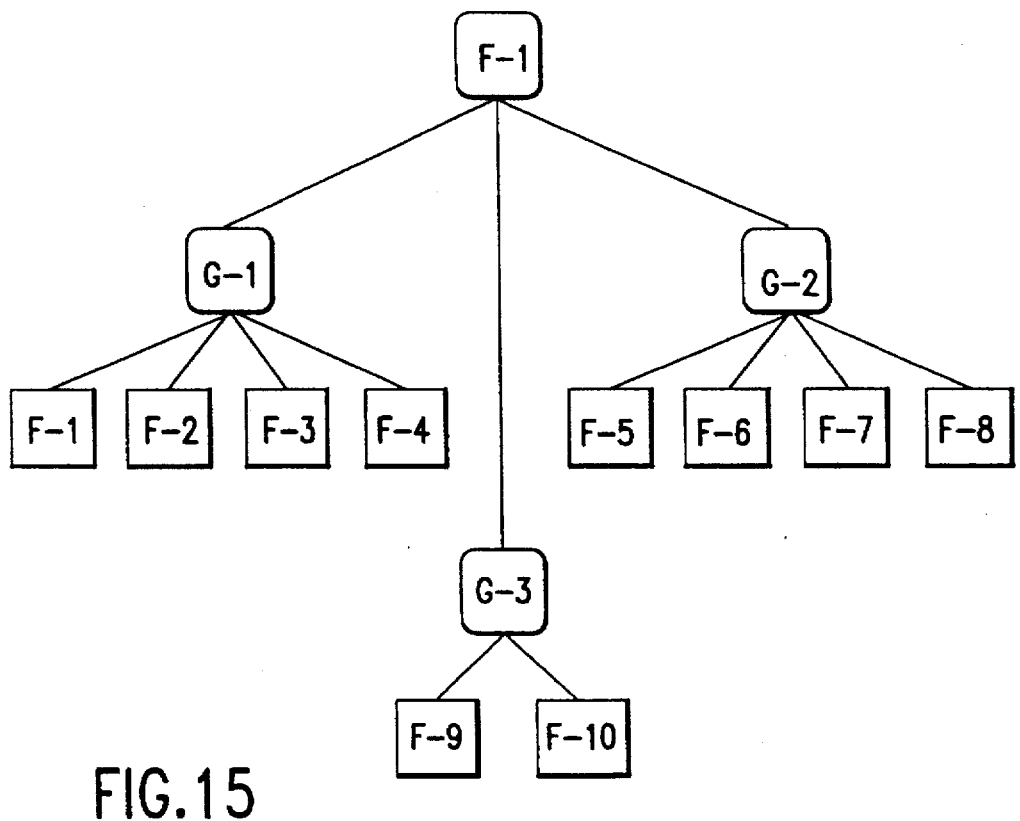
FIG. 15 illustrates an existing resource that is handled by the system configured to use a medium.

FIG. 14 and FIG. 15 illustrate an example of an existing resource that is handled by the system configured to use the medium. FIG. 14 shows the file system-1. The file system-1 is a normal file system used by UNIX (registered trademark) and MS-DOS (registered trademark). File-1 through file-10 are respectively files stored by a predetermined first format. Group-1, group-2 and group-3 are groups representing sets which are empty or have one or more files. These kinds of groups are called directories in UNIX and MS-DOS. The file system, file and directory are resources. The name of file system-1 is FS-1. The names of group-1 to group-3 are G-1, G-2 and G-3 respectively. The names of file-1 to file-10 are F-1 to F-10 respectively. FIG. 15 shows with tiers the relationship between members and the group of groups G-1, G-2 and G-3 and files F-1 through F-10.

Figure 16:
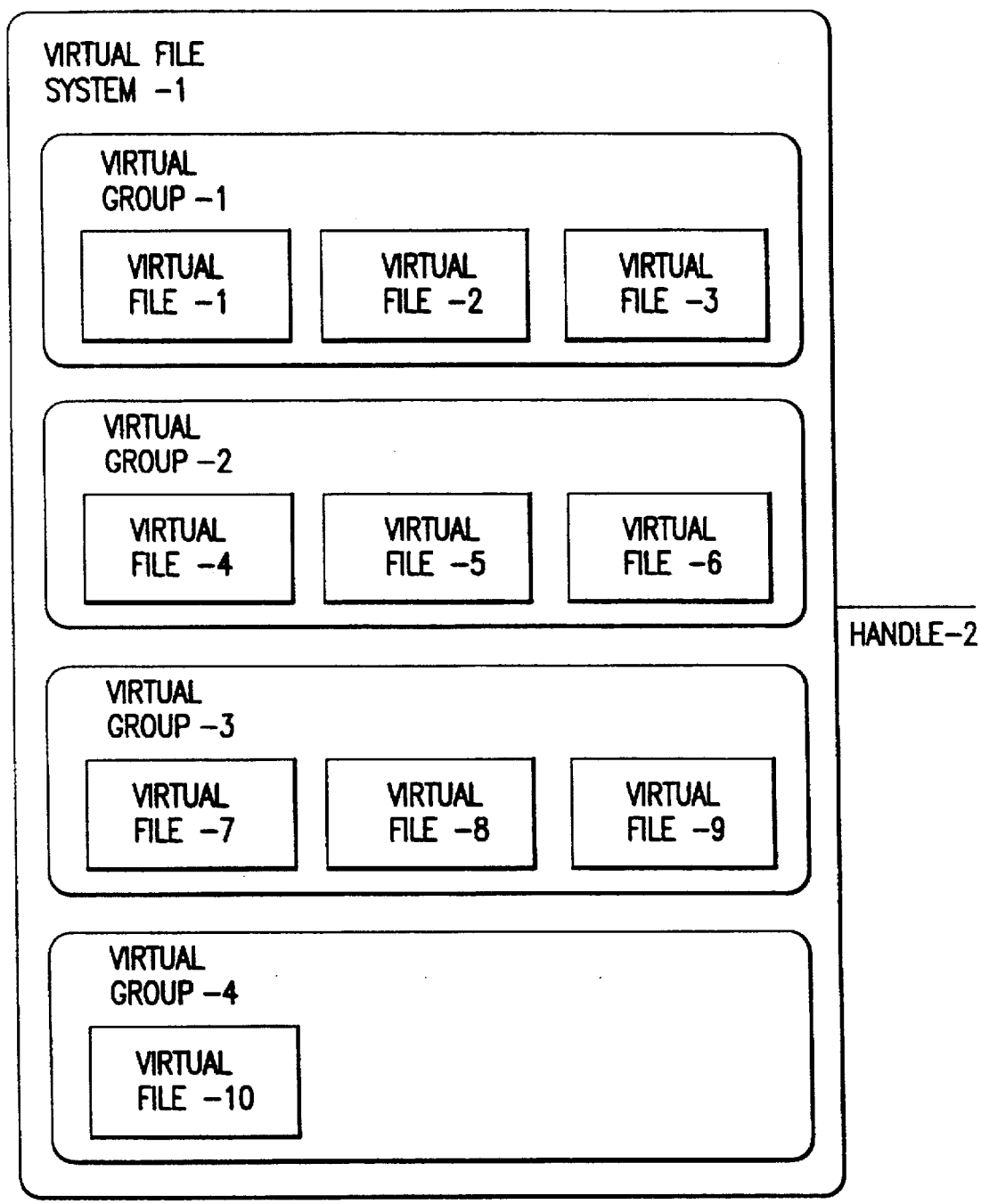
FIG. 16 illustrates virtual resources which are given concrete expression by the system configured to use a medium.
Figure 17:
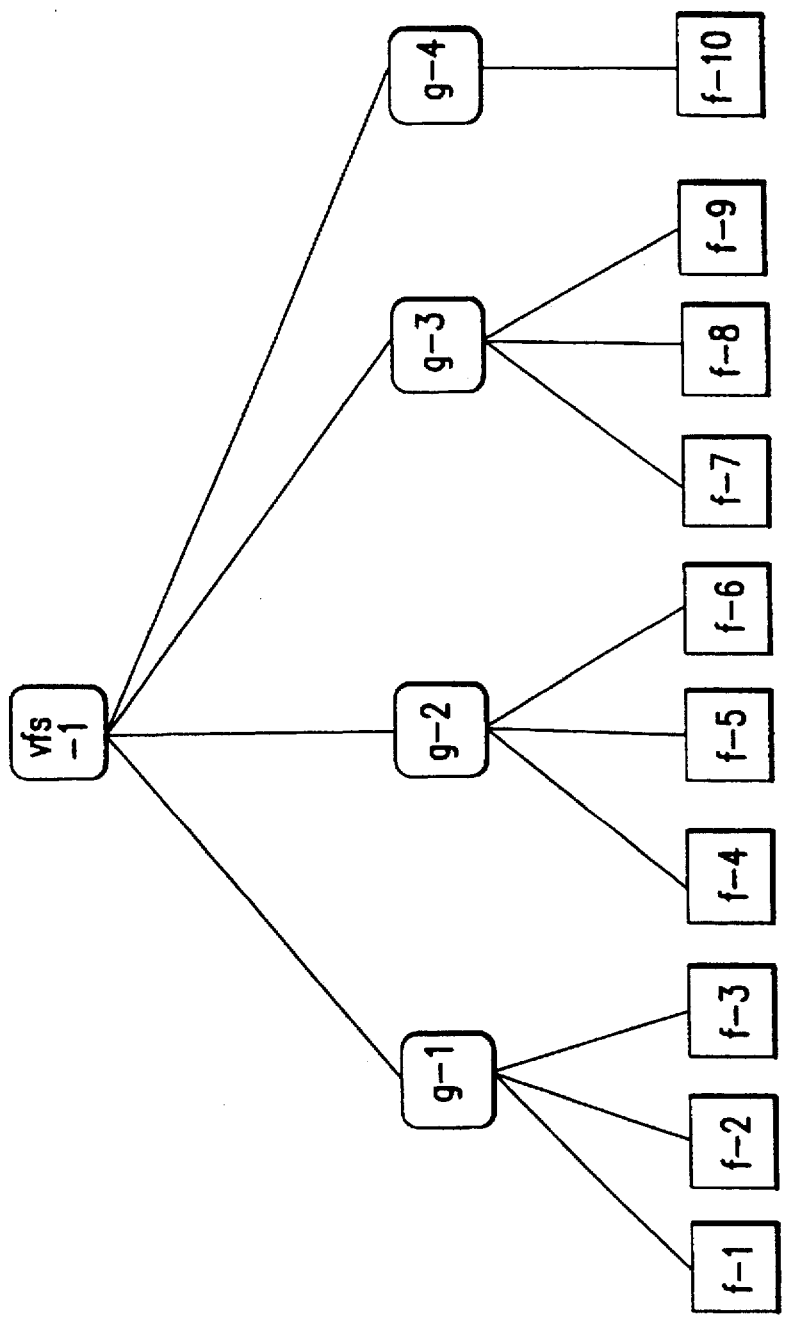
FIG. 17 illustrates virtual resources which are given concrete expression by the system configured to use a medium.
Figure 18:
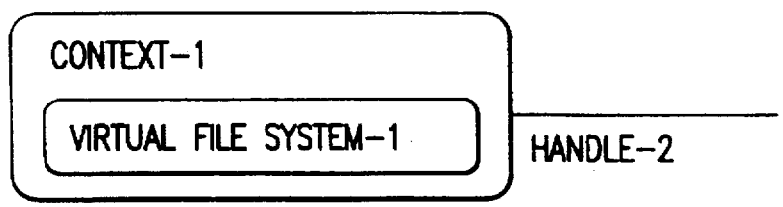
FIG. 18 shows context-1.

FIG. 16 and FIG. 17 illustrate virtual resources which are given concrete expression by the system configured to use a medium and FIG. 18 shows context-1. The virtual resources shown in FIG. 16 are given concrete expression by context-1 and context-2 shown in FIG. 13. FIG. 16 shows a virtual file and virtual group which are provided by the virtual file system. The virtual file system-1 behaves the same as a normal file system used by UNIX or MS-DOS or the like. That is, a file handle is used when a file name is stipulated and an open process is performed, and when input and output are accomplished with respect to the file handle, the system behaves as if the file corresponding to the file name exists and the file data can be written to and read from. The file system and files and groups in the file system are all virtual resources which are given concrete expression by context-1 and context-2.

Virtual file-1 through virtual file-10 are virtual resources which are given concrete expression by context-1 and context-2, which behave as files, respectively. Virtual group-1, virtual group-2 and virtual group-3 are virtual resources which are given concrete expression by context-1 and context-2, which behave as groups representing sets which are empty or have one or more files. The name of the virtual file system is vfs-1. The names of virtual group-i through virtual group-4 are g-1, g-2, g-3 and g-4, respectively. The names of virtual file-1 through virtual file-10 are f-1 through f-10, respectively.

FIG. 17 shows in tiers the relationship between the members and the groups of virtual groups and virtual files. In addition, FIG. 18 shows the context for providing the virtual file systems. Handle-2 for virtual file system-1 is provided by context-1.

Figure 19:
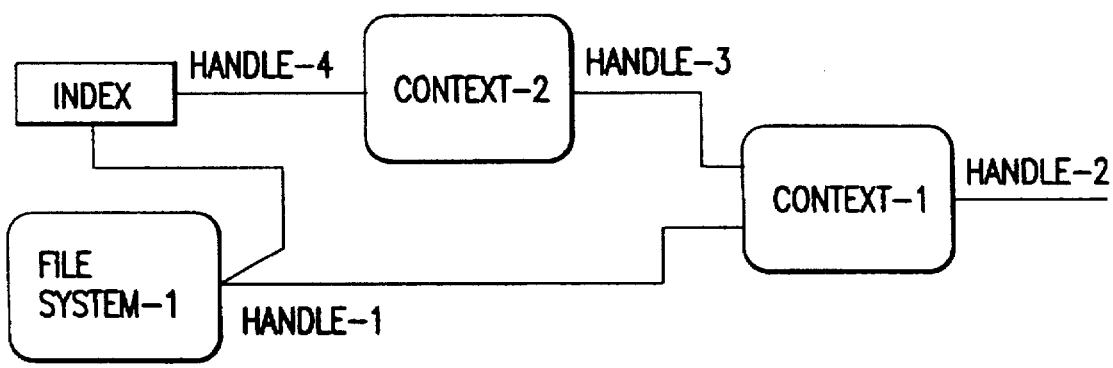
FIG. 19 illustrates a connection between context-1 and context-2, which give concrete expression to the virtual resources.

FIG. 19 illustrates a connection between context-1 and context-2 which gives concrete expression to the virtual resources. FIG. 19 shows the connection relationship between context-1 and context-2, which are contexts, and file system-1 and the database Index, which are real resources. Handle-4 exists as the handle used to access the database Index created from file system-1, which is the file system of the real resources, and context-2 gives concrete expression to the virtual resources of the names Key-1, Key-2, Key-3, Key-4, Key-5 and ALL using handle-4.

Files f-1 through f-10, which are given concrete expression by context-2 are accessed by handle-3. Context-1 gives concrete expression to the virtual group of the names g-1, g-2, g-3 and g-4 using handle-3 and handle-1.

Context-1 and context-2 are the same as that shown in the above-described embodiments, and the process of converting the input names is also accomplished similarly. The action of the name conversion unit are determined by the name conversion table. FIG. 20 and FIG. 21 are name conversion tables. The name conversion table has as entries the names of the virtual resources, and the rows of the table include procedures for processing data and may be empty or may contain one or more resources with respect to the name. The name conversion unit selects from the name conversion table the name of a virtual resources, which was selected by the name analyzing unit, reads the resource, the procedure of the corresponding row, and the resource realization expression.

FIG. 20 shows name conversion table Table-1 of context-1 and, for example, shows that the virtual group g-1 is converted into "member (<context-2, 'Key-1'>)". The procedure "others", which is converted by the virtual group g-4, is a procedure that realizes the group of the file not including the string of keywords for which an argument is supplied. FIG. 21 shows the name conversion table Table-2 of context-2 and, for example, the virtual resource Key-1 is converted into search(Key-1).

Next, an explanation will be provided for the case wherein the context is transferred from user A to user B and the context is customized and incorporated into the computer system of B so that the name resolution tree obtained as the results of the name resolution performed by transfer destination B matches the conditions of B. The name resolution tree is a tree structure with the procedure name that appears in the resource realization expression as a node, and the argument of the procedure as a branch of the node. The name resolution tree represents a condition which is given concrete expression by a predetermined virtual resource as a combination of the real resources and the procedures that manage the resources. What is referred to here as customizing is renewing of the actions of the context so as to give concrete expression to the name resolution tree which is the name resolution tree of a specific name given concrete expression by the context and in which a portion or all of the tree is changed.

First, the action of context-1 of user A will be described. The name conversion unit of context-1 converts the group name g-1 into the resource realization expression "member (<context-2, 'Key-1'>)" through name conversion table Table-1 shown in FIG. 20. Key-1 is a predetermined keyword. "Member" is the name of a procedure that maintains one item of record-format data as the argument, and the contexts of the record are a list of file names.

The handle, which is obtained by the resource realization unit interpreting the name resolution tree obtained as the results of the name resolution unit interpreting the name g-1, responds to the operation of the group which is the virtual resources and behaves so that the group is given concrete expression. For example, the procedure, which "member" indicates, is formed as a port which inputs and outputs handles which are operable as directories, and is a program which enables "opendir" (opening of the operation of the directory) and "listmember" (obtaining a list of the members of the directory) as predetermined operations.

The resource realizing unit activates the procedure that "member" indicates as a process, and the input of the argument is connected to the handle-3, which is formed of <context-2, Key-1> while the output is connected to handle-2. The connection between the input and output of the process and the handles can be realized, for example, by the pipeline of UNIX and redirection. The pipeline of UNIX mutually connects the output port of process A and the input port of process B. Redirection connects the input port of process A to the file handle of file C and allows data to be read from file C, while the output port is connected to the file handle of file D so that data is written to file D.

In A, the resolution of the <context-2, Key-1>, which was developed to the procedure "member" as the argument depends on context-2, and the handle, which as a result interprets and obtains the name resolution tree obtained, represents a virtual record formed of a list of file names including the keywords equivalent to the name that is Key-1.

When Key-1 is resolved by context-2, the command "search (Key-1)" to the database is obtained so as to extract from files F-1 to F-10 the list of files having as keyword the character string equivalent to Key-1. The database may include a record-format database and may also be realized through a relational database including a table formed of one keyword and a predetermined number or variable number of file names.

In this embodiment, the database "Index" is realized through the accumulation of records:

keyword1: Fx, Fx+1, . . .

Keyword2: Fy, Fy+1, . . .

In searching the records including keyword1 from the database "Index" it is acceptable, for example, for the records to be respectively the files F-1 to F-10 which are stored in the UNIX file system through the "grep" command. When one keyword that conforms to a predetermined syntax rule as the argument at the start time and one or more file names are made into a string, the group command can be caused to act so as to output the row including the keyword and the file name including the keyword from all of the files of the file name indicated in the argument.

In the present embodiment, searching is accomplished by the following process. First, all of the files having a record as the object are searched to determine if key-1 is included or not, and if it is included, the file name is output. The file name is not output if the keyword is not included. The process is concluded when all of the object files have been considered. For example, in FreeBSD, which is a UNIX system OS, the search command is csh script, and may be:

for each f('grep-1 Keyword1 */F.*')

echo -n "-.A$-(Bf"

end

When Key-1 is input into context-2, it is resolved to the search command string of the records in which Key-1 is recorded as the keyword with respect to the database "Index". That is, the name analyzing unit of context-2 divides out the character string Key-1, the name conversion unit searches for the entry Key-1 of the name conversion table shown in FIG. 21 through the character string Key-1, and the procedure "search (Key-1)" is obtained. Further, the name resolution unit creates the resource realization expression "search (Key-1)", the resource realizing unit starts the procedure "search" as the process "search" from the resource realization expression "Search (Key-1)", and the handle, which operates the database "Index" and the communication port of the process "search", are combined. The process "search" issues the search command such as searching for Key-1 as the keyword to the database "Index" via handle-4. The list "F-1, F-2, F-3", for example, is obtained from the database "Index" as the search result. The search result is output to handle-3 as the response to the read file command from handle-3.

FIG. 22 is an example of a search result obtained from the database "Index". As described above, in the case of this example, when the files F-1, F-2 and F-3 include the character string Key-1 as the keyword, "F-1, F-2, F-3" is output as indicated by the first row of FIG. 22. When there is no record of attempting to search, an empty list is output. In FIG. 22, this is indicated by the string which is obtained as the execution result of the search command in each row of the virtual resource of the name conversion table shown in FIG. 21 being caused to correspond with the table shown in FIG. 21.

Next, the case wherein the operation "listmember" is accomplished with respect to handle-1, which is opened by the group g-1 that is the virtual group of context-1, is described. The operation "listmember" is an operation of the type that outputs a list of members of the group. In the UNIX file system, the ls command is well known.

When "listmember g-1" is executed as a command, the name analyzing unit of context-1 divides out the character string g-1, the name conversion unit searches the g-1 entry of the name conversion table through the character string g-1, and the procedure "member (<context-2, 'Key-1'>)" is obtained. Further, the name resolution unit of context-1 creates the resource realization expression "member (<context-2, 'Key-1'>)", the resource realizing unit starts the procedure "member" as the process "member" from the resource realization expression "member (<context-2, 'Key-1'>)", the file which is Key-1 of context-2, is opened, and handle-3 and the communication port of the process "member" are joined. The process "member" obtains the list "F-1, F-2, F-3" as the result with the file of the name Key-1 as the lead. The process "member" performs character analysis on the list "F-1, F-2, F-3" and outputs in a predetermined format the operation results that take as members F1, F2 and F3, respectively, to the command "listmember" input from handle-2. For example, when this is output as the set of rows including one member in one row, the operation results:

member1: F-1
member2: F-2
member3: F-3 are obtained.

Now, in the virtual file system Vfs-1, the design is such that when access is accomplished by means of the name of the file names F-1, F-2 and F-3, the virtual files f-1, f-2 and f-3 are respectively accessed. For purposes of explanation and to avoid confusion, a different symbol is attached to distinguish between the virtual file and the real file. That is, when '=' has the same meaning as a character string, F-1=f-1, F-2=f-2, and F-3=f-3. Therefore, even if the access is by means of the same file name, in the virtual files, a file having a different merit is accessed.

As described above, the assumption is that a process determined by "member (<context-2, Key-1>)" is accomplished and the file names F-1, F-2 and F-3 are output as the result. Because the file names F-1, F-2, and F-3 are interpreted as the names of the virtual files, in actuality the virtual file names f-1, f-2 and f-3 are accessed. That is, <context-1, 'F-1'> indicates <context-1, 'f-1'> and similarly <context-2, 'F-2'>, <context-3, 'F-3'>, etc. respectively indicate <context-2, 'f-2'>, <context-3, 'f-3'>, etc.

The virtual file names f-1, f-2, and f-3 are the means, respectively, of virtual file-1, virtual file-2 and virtual file-3. Virtual file-1 is a virtual file obtained by executing some kind of process on file-1. For example, if file-1 is an image file, the virtual file is a virtual image file representing an image with different resolution with the same content as the image of file-1 and is obtained by executing the procedure having the name "resample" as a process which converts the resolution. The resolution of file-1 is 1600 pixels per inch (1 inch being 25.4 mm) and if the process which converts the resolution is one that converts the resolution from 1600 pixels per inch to 400 pixels per inch, one of the properties of virtual file-1 is a resolution of 400 pixels per inch. Similarly, virtual file-2 corresponds to file-2 and virtual file-3 corresponds to file-3, and if the context is formed such that file-2 and file-3 are images of 1600 pixels per inch resolution, f-2 is resolved by <L, F-2> and f-3 is resolved by <L, F-3>, f-1, f-2 and f-3 are given concrete expression as virtual files with 400 pixels per inch, in contrast to the property of F-1, F-2 and F-3, that is, a resolution of 1600 pixels per inch.

In accomplishing this kind of name resolution, it is acceptable for the name conversion unit to have a name conversion table Table-1 such as is shown in FIG. 20. Here, <file system-1, F-1> is a file with the name F-1 of file system-1, that is, the real file F-1. From the virtual file f-1, the action and resolution of resample (<file system-1, F-1>) is the same as the action and resolution of the above-described virtual group g-1, so explanation of such is omitted here.

The process used in conjunction with resolution, besides the above-described resolution conversion, may in general be an arbitrary converting process such as a format conversion or a protocol conversion. In addition, the process which was described was a process of one argument, but it may be an arbitrary process of an arbitrary argument. For example, in the case of a process M of two arguments that conducts a composition process on two items of image data, the predetermined name N is resolved as in <M, F-2, F-3>, the process M adds image data of the file F-2 and the file F-3 at each pixel, and as a result a process is formed that composes the image data so that a single image data is output for reading. For writing, the operation desired by the designer of the context may be resolved into an arbitrary process that provides the files F-2 and F-3. The virtual resource for N in this case can be given concrete expression as the single virtual image file obtained by composing the files F-2 and F-3.

It is acceptable to include the above-described substance of the procedure in the context, or to not include such. When the procedure is not included in the context, the procedure name which the context resolved is started in A and B, and the function that connects the handles is prepared separately so that it is possible to input and output to and from the resource which the context has resolved. The actions of the procedure indicating the same procedure name is assumed to be the same in A and B, but these need not necessarily be the same. However, it is necessary to process the handle of the argument which is stipulated at least by the procedure.

When the substance of the procedure is included in the context, it is necessary for the procedure to be operable by A and B. In order to operate the procedure by means of A and B, the conventional method is used. For example, there is a method that uses a procedure process system which can execute the source program and intermediate object code interpretively, a method which can accomplish compiling prior to operation and can operate from creation of the execution format, and an emulation method that directly interprets and executes the execution format.

Next, the process that duplicates the context which is thus formed, and records and maintains the context on a removable medium will be described. In A, the context to be duplicated is selected. The method of selecting the context may be a search for the context using a context search expression such as in the above-described embodiments. As a context search expression, it is possible to stipulate the set or string of the context through a search command for the database and to stipulate one by one the names of the context. In addition, similar to the find command in the UNIX file system, a method may also be used that likens the file to a tree structure and actually performs resolution of the names successively, searches the tree structure using a predetermine format and determines the context that satisfies the predetermined conditions. This is used in serializing one or more files which are stored in a directory having a tree structure to make one file. In UNIX, this is known as the "tar" command.

In general the reference relationship between contexts which are used when the context performs resolution is an oriented graph. Accordingly, in order to avoid an endless process being continued when searching the subgraph which is a loop, a flag that marks that which has already been searched is prepared in the context, or a list of the names and identifiers of the contexts which have been searched is maintained separately. Because the algorithm of this kind of graph search is already well-known, a detailed description of this will not be given here.

Here, two contexts are stipulated and duplicated and recorded on the medium 34. The recording medium 34 is for example a CD-ROM which is stipulated by ISO9660, and the context can be recorded permanently as a file on the CD-ROM. Naturally, it is possible to use various media such as floppy disks or disk packs.

The duplication of the context is assumed to be accomplished by duplicating the name conversion table used in resolution of the context. However, in general the object, which is the object of duplication, is information necessary to restore the context, which has been duplicated on the medium at the transfer destination. For example, this may be the syntax table used in name analysis, the procedure that realized the resource or the value of the status variable that determines the status of the context.

FIG. 23 and FIG. 24 show context recorded on a medium. For example, the table and procedure can record on the medium as shown in FIG. 23 and FIG. 24 using HTML language. FIG. 23 is an image of context-1 which has been duplicated, and the contents shown in FIG. 20 are recorded by HTML language as the name conversion table. The image of context-1 which has been duplicated is called Spec-1. In addition, FIG. 24 is the image of context-2 which has been duplicated, and the contexts shown in FIG. 21 are recorded as the name conversion table. This image of context-2 which has been duplicated is called Spec-2.

The context illustrates an example which is described through HTML language, but naturally it is acceptable to describe this using another language. In addition, the context is duplicated by a text description on the basis of a predetermined grammar and may be a table-format database. Then, the context is realized as the interface and class of the object oriented language, and the interface or class of the context which has been realized is stored in the object-oriented database and may be made permanent.

The above-described ISO9660 has a stronger limitation such as a file name or the like than the normal file system in UNIX, but is used here as one example and the limitations on the file name have no relation with the actions of the invention.

Next, the process, when connecting the CD-ROM on which the images Spec-1 and Spec-2 of the context, shown in FIG. 23 and FIG. 24, to the computer of B and incorporating the two contexts into the computer of B, will be described. The context exists beforehand in B, and the action of name resolution of the context is changed by switching the name resolution table of the context. Or, the context is stored on the CD-ROM in the form of a source program or an object program, and may be started by the computer at the move destination. This example is in the form of the above-described third embodiment.

After context-1' and context-2' have been started, or when they are started, Spec-1 and Spec-2, which are prepared as files on the CD-ROM, are read. Context-1' and context-2' each have a resource realizing unit, a name analyzing unit and the name analyzing unit of context-1 in order to reproduce the action of context-1 and context-2.

Figure 25:
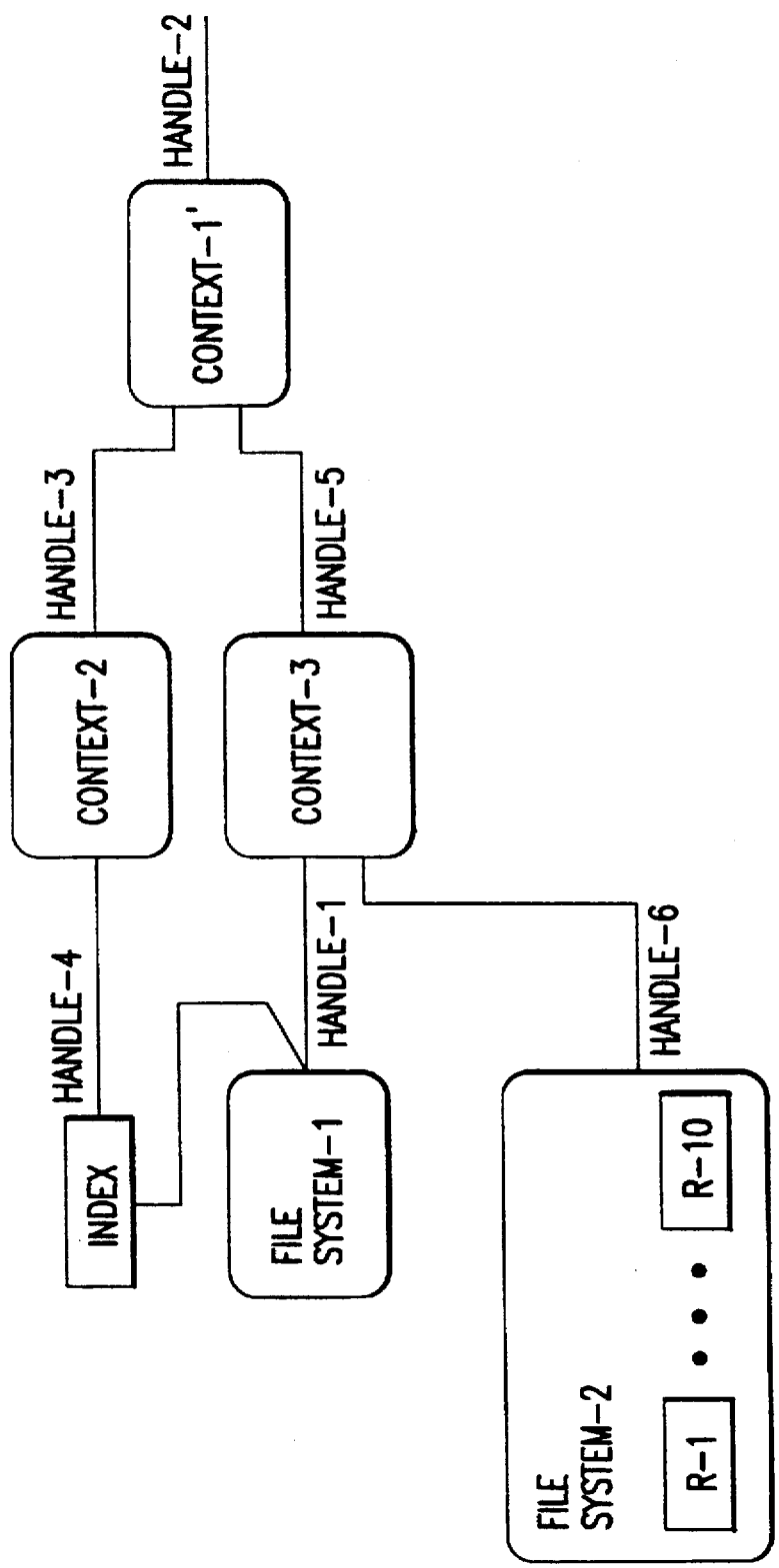
FIG. 25 illustrates a connection of each context that gives concrete expression to the virtual resources through customization.

Next, the process that customizes the context will be described. FIG. 25 illustrates a connection of each context that gives concrete expression to the virtual resources through customizing. First, the method of customizing the resources which are the object of resolution will be described. In place of the files F-1 to F-10, the files R-1 to R-10, the contents of which are mutually duplicated and in which non-contradiction is preserved, are assumed to exist in the system of B. This kind of setup is already known, and can be realized for example with the rdist command of UNIX. The rdist command acts in cooperation in the differing computer systems in the network, looks up the time stamp of the files of the respective computer systems and judges whether the files are new or old, and copies the new files in place of the old files. B is assumed to want this kind of customizing because the access cost is lower when files R-1 to R-10 are accessed than when the files F-1 to F-10 are accessed.

B prepares a new context-3. FIG. 26 is a name conversion table of context-3. Context-3 is formed, as shown, for example, in FIG. 26, so that when the name f-1 is input, the name is resolved into the file name R-1, the file name F-1 and the procedure "check_and_copy". Handle-1 and handle-6 obtained by evaluating the results of name resolution of f-1 are accomplished similar to the input and output with respect to the file F-1 with respect to manipulation of input and output. What differs this time is that the final modification time of the file F-1 and the file R-1 are checked at the time of the open process, and if the file R-1 is old, the procedure "check_and_copy" is executed to copy from the file F-1 to the file R-1 using a predetermined transfer procedure. Nothing is done if the file F-1 is older. In addition, at the time of the close process, the procedure "check_and_copy" checks the final modification time of the file F-1 and the file R-1, and if the file F-1 is older, locks the writing to the file F-1 and copies from the file R-1 to the file F-1 using a predetermined transfer process. The files R-1 to R-10 are assumed to be in file system-2.

In context-3 also, file F-1 and virtual file f-1, file F-2 and virtual file f-2, and file F-3 and virtual file f-3 are assumed to have the same name, the same as in context-1, but the symbols are distinguished here in order to avoid confusion in the explanation.

Context-3 can be used from all applications that handle the virtual file f-1 as the file F-1 in common with other applications. Accordingly, context-3 is prepared beforehand and realized.

FIG. 27 is a name conversion table of context-1'. The virtual file f-1 of context-1 is the same image as file F-1, but is read with the resolution differing. On the other hand, in B the resolution is the same as in the file F-1, but a replica of the file F-1 is used. Hence, for the entries from f-1 to f-10 in the name conversion table of context-1 shown in FIG. 20, the desire is to customize "resample (<file system-1, F-n>)" to be <context-3, f-n> when n ranges from 1 to 10.

When context-1 and context-2 are read, the context loader L customizes context-1 in accordance with the commands from user B. That is, "resample (<context-1, f-n>)" of Spec-1 is mechanically replaced by <context-3, f-n>. Thus, the name conversion table shown in FIG. 27 is obtained.

The replacement can use a simple text replacement editor that uses normal expressions if Spec-1 and Spec-2 are text files. The editor commands for replacement can be automatically formed from the name conversion table of context-3. The command used in automatically making the replacement is one "to customize so as to use f-k (a replica of F-k) of context-3 in place of f-k (F-k in which the resolution has been modified) of context-1 (with k being an integer possible in context-1)". On the basis of this command, Spec-1 is read in order for all of the f-k (here k is an integer), and if the entry in all of the rows of the name conversion table is f-k, that entry is replaced by <context-3, f-k>. Further, a new context-1' is started using Spec-1' in which modifications have been completed for all rows.

In addition, as editors that execute this kind of replacement command, the commands "sed" and "ex" exist in UNIX, for example. If the format is one that handles any of the tables, replacing the replacement names and replaced names by analyzing the dedicated editor and the format of the table and searching the expression tree of the table, which has been analyzed, and making an addition is possible with a method which is known.

If this is done, when B requests resolution of the virtual file name f-1 to context-1', context-1' obtains the resource realization expression <context-3, f-1> on the basis of the name conversion table shown in FIG. 27. From the resource realization expression, resolution of the virtual file name f-1 is requested on context-3. Context-3 resolves the virtual file name f-1 to the procedure "check_and_copy (R-1, F-1)" on the basis of the name conversion table shown in FIG. 26, normal reading and writing are accomplished for the file R-1 which is a replica of the file F-1, and copying is accomplished between the file R-1 and the file F-1 as necessary at the time of the open and close processes. Accordingly, the file R-1 which is a replica of the file F-1 becomes accessible to B while B uses the same virtual file name f-1.

Figure 28A:
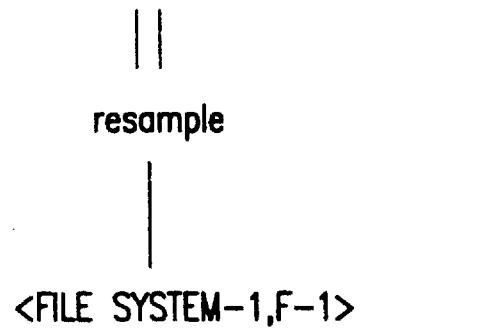
FIG. 28 is a name resolution tree.
Figure 28B:
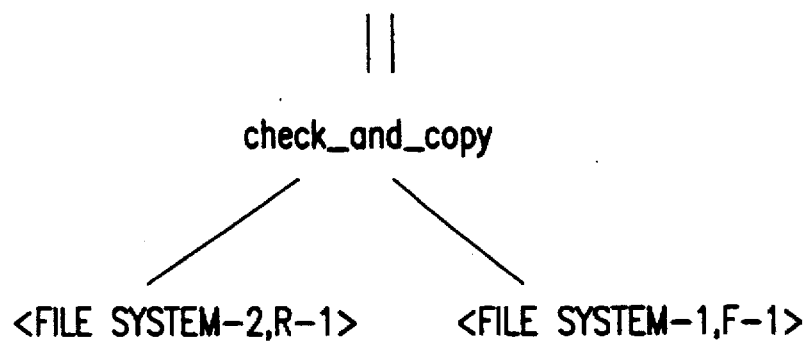

FIG. 28 is a name resolution tree. The name resolution tree of f-1 of A is shown in FIG. 28(A), and the name resolution tree of f-1 of B is shown in FIG. 28(B). In this embodiment, an example is described wherein the actions of the name conversion unit is changed by altering the name conversion table and the actions of the context are customized, but the method of making alterations to perform customizing is not limited to this. For example, it is possible to alter the actions of the name analyzing unit if the syntax table which is used for name analysis is changed. Or, the status variable that determines the status of the context may be changed.

In this way, it is possible for B to provide a function which not only can give concrete expression easily to a virtual file system equivalent to the virtual file system used in A, but that also customizes as-is and incorporates into the computer of B the suboperation and properties possessed by a portion of the name space which was designed and given concrete expression by A in accordance with the circumstances of B. Customizing is accomplished through changing the incorporation and method of connecting context and context, and changing the status of the context, the actions of the name analyzing unit and the name conversion unit of the context. As the contents of customization, replacing, appending or deleting the resources which have already been realized, and replacing, appending or deleting the procedures, which are necessary in giving expression to the virtual resources, can be considered.

In addition, it is possible to distribute contexts by transferring the context from one computer to another computer using the medium 34. In this example, the case wherein the context was transferred and distributed via the medium 34 was described, but it is intended to be illustrative and not limiting, for it is possible to transfer and distribute the context via a network as in the above-described embodiments, and even in that case it is possible to accomplish customization similarly. In addition, it is also possible to transfer context which has been customized and to then undertake further customization. In addition, it is possible for the portion (space) which can be fixed to be comprised so as to be distributed using a medium such as a CD-ROM, floppy or the like, and to be plugged into its own space, and the variable portion is distributed by a network and used in common. Further, the composition may also be such that the it is possible to fuse the existing space and the space which has been transferred.

The fusing method or untying method for the context need not be determined uniquely because if the context constructing unit is also included in the context which has been transferred, for example as in the above-described third embodiment, it is possible for the context to be created through the context constructing unit which has been sent.

In addition, as can be understood from the explanation above, the name space, which this context provides through the transfer of context, is transferred, but the information itself is not necessarily transferred. Consequently, the name space can perform dissemination and switching by separating the space and the information itself from the space which is arranged by the information having predetermined properties. That is, it is possible to disseminate by separating the information itself from only an arrangement (=variety) method that provides the predetermined properties and a process that provides the predetermined properties to the information.

While the invention has been described in conjunction with specific embodiments thereof, it is evident that many alternatives, modifications and variations may be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A resource management system, of the type wherein processes are applied to real resources, which are previously input into a computer system that performs information processing, to obtain new resources, the system comprising:

a plurality of context maintaining units that respectively establish a correspondence with attributes, wherein each of the context maintaining units comprise:

an attribute maintaining unit that stores in memory attributes of the respective context maintaining unit;

a name analysis unit that performs name analysis on resource names using as input resource names given to the resources, to obtain name analysis results; and a name conversion unit that converts name analysis results from the name analysis unit into one of a first resource realization expression and a second resource realization expression, wherein the first resource realization expression contains at least one ordered pair of a first resource element string containing resource search expressions used to designate real resources and a first realization element string containing information used to determine procedures that process the real resources determined from the first resource element string, and the second resource realization expression contains at least one ordered pair of a second resource element string containing ordered pairs composed of resource names and a first context search expression used to search at least one of the plurality of context maintaining units and a second realization element string containing information used to determine procedures that process the resources determined from the second resource element string; and the system further comprising:

a selection unit that creates second context search expressions used in searching the at least one of the plurality of context maintaining units on the basis of the expressions previously input, using as input the expressions used to select the at least one of the plurality of context maintaining units;

a context search unit that searches the at least one of the plurality context maintaining units having attributes in accordance with the first context search expressions obtained by the name conversion unit of the respective context maintaining unit and a context maintaining unit having attributes in accordance with the second context search expressions created by the selection unit; and an extraction unit that outputs a context expression that includes information necessary to create a context maintaining unit equivalent to the context maintaining unit searched by the context search unit on the basis of the second context search expressions.

2. The system of claim 1, further comprising:

a name resolution unit that outputs a resource name in the second resource element string obtained from the name conversion unit, to the context maintaining unit which has been searched by the context search unit on the basis of the first context search expressions that form an ordered pair with the resource names.

3. The system of claim 1, wherein each context maintaining unit further comprises:

a name resolution unit that outputs to the context search unit the first context search expressions contained in the second resource realization expression obtained from the name conversion unit, and outputs resource names that form an ordered pair with the first context search expressions to the context maintaining unit that was searched by the context search unit on the basis of the first context search expressions.

4. The system of claim 3, further comprising:

a resource database used to designate the real resources; and a resource database search unit, into which are input resource search expressions contained in the first resource realization expression obtained from the name conversion unit, and which searches the real resources corresponding to the resource search expressions from the resource database, wherein the context maintaining unit further comprises:

a resource realization unit that determines procedures by interpreting the first realization element string contained in the first resource realization expression obtained from the name conversion unit, and that creates resources by executing the determined procedures on the real resources which have been searched by the resource database search unit.

5. The system of claim 1, further comprising:

a resource database used to designate the real resources;

a resource database search unit, into which are input resource search expressions contained in the first resource realization expression obtained from the name conversion unit, and which searches the real resources corresponding to the resource search expressions from the resource database; and a resource realization unit that determines procedures by interpreting the first realization element string contained in the first resource realization expression obtained from the name conversion unit, and that creates resources by executing the determined procedures on the real resources which have been searched by the resource database search unit.

6. The system of claim 1, wherein each of the plurality of context maintaining units further comprises a self-constructing unit that creates a context maintaining unit equivalent to the respective context maintaining unit.

7. The system of claim 1, further comprising:

a duplicating unit that writes to a medium, which is partitionable by the computer system, the context expression output by the extraction unit.

8. A resource management system, of the type wherein processes are applied to real resources, which are resources previously input into a computer system that performs information processing, to obtain new resources, the system comprising:

a plurality of context maintaining units that respectively establish a correspondence with attributes, wherein each of the context maintaining units comprise:

an attribute maintaining unit that stores in memory attributes of the respective context maintaining unit;

a name analysis unit that performs name analysis on resource names using as input resource names given to the resources, to obtain name analysis results;

a name conversion unit that converts the name analysis results from the name analysis unit into one of a first resource realization expression containing at least one ordered pair of a first resource element string containing resource search expressions used to designate real resources and a first realization element string containing information used to determine procedures that process the real resources determined from the first resource element string, and a second resource realization expression containing at least one ordered pair of a second resource element string containing ordered pairs composed of resource names and first context search expressions used to search one of the plurality of context maintaining units and a second realization element string containing information used to determine procedures that process the resources determined from the second resource element string; and the system further comprising:

an extraction unit that outputs a context expression that includes information necessary to create a context maintaining unit equivalent to the respective context maintaining unit;

a selection unit that creates second context search expressions used in searching at least one of the plurality of context maintaining units on the basis of expressions previously input, using as input expressions used to select the at least one of the plurality of context maintaining units;

a context search unit that searches the at least one of the plurality of context maintaining units having attributes in accordance with the first context search expressions obtained by the name conversion unit of the context maintaining unit and a context maintaining unit having attributes in accordance with the second context search expressions created by the selection unit, wherein the selection unit requests output of the context expression from the extraction unit contained in the context maintaining unit searched by the context search unit on the basis of the second context search expressions and furthermore, receives and outputs the context expression output by the extraction unit in accordance with the request for output of the context expression.

9. The system of claim 8, further comprising:

a name resolution unit that outputs a resource name in the second resource element string contained in the second resource realization expression obtained from the name conversion unit to the context maintaining unit which has been searched by the context search unit on the basis of the first context search expressions which form an ordered pair with the resource names.

10. The system of claim 8, wherein each context maintaining unit further comprises:

a name resolution unit that outputs to the context search unit the first context search expressions contained in the second resource realization expression, which was obtained from the name conversion unit, and outputs resource names which form an ordered pair with the first context search expressions to the context maintaining unit which was searched by the context search unit on the basis of the first context search expressions.

11. The system of claim 10, further comprising:

a resource database used to designate the real resources; and a resource database search unit, into which are input resource search expressions contained in the first resource realization expression obtained from the name conversion unit, and which searches the real resources corresponding to the resource search expressions from the resource database, wherein the context maintaining unit further comprises:

a resource realization unit that determines procedures by interpreting the first realization element string contained in the first resource realization expression obtained from the name conversion unit and creates resources by executing the determined procedures on the real resources which have been searched by the resource database search unit.

12. The system of claim 8, further comprising:

a resource database used to designate the real resources;

a resource database search unit, into which are input resource search expressions contained in the first resource realization expression obtained from the name conversion unit, and which searches the real resources corresponding to the resource search expressions from the resource database; and a resource realization unit that determines procedures by interpreting the first realization element string contained in the first resource realization expression obtained from the name conversion unit, and that creates resources by executing the determined procedures on the real resources which have been searched by the resource database search unit.

13. The system of claim 8, wherein each of the plurality of context maintaining units further comprises a self-constructing unit that creates a context maintaining unit equivalent to the respective context maintaining unit.

14. The system of claim 8, further comprising:

a duplicating unit that writes to a medium, which is partitionable by the computer system, the context expression output by the extraction unit.

15. A resource management system, of the type wherein processes are applied to real resources, which are resources previously existing in a computer system which performs information processing, to obtain new resources, the system comprising:

a context search unit that searches at least one context maintaining unit, the at least one context maintaining unit comprising:

an attribute maintaining unit that stores in memory attributes of the context maintaining unit;

a name analysis unit that performs name analysis on resource names using as input the resource names given to the resources, to obtain name analysis results;

a name conversion unit that converts the name analysis results from the name analysis unit into one of a first resource realization expression containing at least one ordered pair of a first resource element string containing resource search expressions used to designate real resources and a first realization element string containing information used to determine procedures that process the real resources determined from the first resource element string; and a second resource realization expression containing at least one ordered pair of a second resource element string containing ordered pairs formed of resource names and first context search expressions used by the context search unit to search the at least one context maintaining unit and a second realization element string containing information used to determine procedures that process the resources that are determined from the second resource element string; and a constructing unit that receives a context expression output as information necessary for another resource management system to create second context search expressions in order to search a desired context maintaining unit from among the at least one context maintaining unit in the resource management system and that creates a context maintaining unit equivalent to the at least one context maintaining unit searched on the basis of the second context search expressions, wherein the context search unit is a means into which are input the first context search expressions obtained by the name conversion unit in the context maintaining unit created composed by the constructing unit and which searches the at least one context maintaining unit having the attributes corresponding to the first context search expressions.

16. The system of claim 15, further comprising:

a name resolution unit that outputs a resource name in the second resource element string contained in the second resource realization expression converted by the name conversion unit context maintaining unit created by the constructing unit, to the at least one of the context maintaining unit which is searched by the context search unit on the basis of the first context search expressions which form an ordered pair with the resource names.

17. The system of claim 15, wherein the at least one context maintaining unit further comprises:

an extraction unit that outputs a context expression that comprises information necessary to create a context maintaining unit equivalent to the at least one context maintaining unit.

18. The system of claim 17, wherein the at least context maintaining unit further comprises:

a name resolution unit that outputs to the context search unit first context search expressions contained in the second resource realization expression obtained from the name conversion unit and outputs the resource name in the second resource element string contained in the second resource realization expression to a context maintaining unit from among the at least one context maintaining unit which has been searched by the context search unit on the basis of the first context search expressions.

19. The system of claim 18, further comprising:

a resource database used to designate the real resources; and a resource database search unit, into which are input resource search expressions contained in the first resource realization expression obtained from the name conversion unit and which searches the real resources corresponding to these resource search expressions from the resource database, wherein the context maintaining unit further comprises a resource realization unit that determines procedures by interpreting the first realization element string contained in the first resource realization expression obtained from the name conversion unit, and creates resources by executing the determined procedures on the real resources which have been searched by the resource database search unit.

20. The system of claim 17, further comprising:

a resource database used to designate the real resources;

a resource database search unit, into which are input resource search expressions contained in the first resource realization expression obtained from the name conversion unit, and which searches the real resources corresponding to the resource search expressions from the resource database; and a resource realization unit that determines procedures by interpreting the first realization element string contained in the first resource realization expression obtained from the name conversion unit and that creates resources by executing the determined procedures on the real resources which have been searched by the resource database search unit.

21. The system of claim 17, wherein the constructing unit reads from a medium, which is partitionable by the computer system and is loaded into the computer system, the context expression and creates a context maintaining unit from the context expression.

22. The system of claim 17, wherein the constructing unit can overwrite the name conversion unit in the context maintaining unit being created.

23. The system of claim 15, wherein the at least one context maintaining unit further comprises:

a name resolution unit that outputs to the context search unit first context search expressions contained in the second resource realization expression obtained from a name conversion unit and outputs the resource name in the second resource element string contained in the second resource realization expression to a context maintaining unit from among the at least one context maintaining unit which has been searched by the context search unit on the basis of the first context search expressions.

24. The system of claim 23, further comprising:

a resource database used to designate the real resources; and a resource database search unit, into which are input resource search expressions contained in the first resource realization expression obtained from the name conversion unit, and which searches the real resources corresponding to the resource search expressions from the resource database, wherein the context maintaining unit further comprises:

a resource realization unit that determines procedures by interpreting the first realization element string contained in the first resource realization expression obtained from the name conversion unit, and that creates resources by executing the determined procedures on the real resources which have been searched by the resource database search unit.

25. The system of claim 15, further comprising:

a resource database used to designate the real resources;

a resource database search unit into which are input resource search expressions contained in the first resource realization expression obtained from the name conversion unit, and which searches the real resources corresponding to the resource search expressions from the resource database; and a resource realization unit that determines procedures by interpreting the first realization element strings contained in the first resource realization expression obtained from the name conversion unit, and that creates resources by executing the determined procedures on the real resources which have been searched by the resource database search unit.

26. The system of claim 15, wherein the constructing unit reads from a medium, which is partitionable by the computer system and is loaded into the computer system, the context expression and creates a context memory from the context expression.

27. The system of claim 15, wherein the constructing unit can overwrite the name conversion unit in the context maintaining unit being created.

28. A resource management system of the type used in a computer system that performs information processing, the system comprising:

a context search unit that searches at least one context maintaining unit, the at least one context maintaining unit comprising:

an attribute maintaining unit that stores in memory attributes of the at least one context maintaining unit;

a name analysis unit that performs name analysis on the resource names using as input the resource names given to the resources, to obtain name analysis results; and a name conversion unit that converts the analysis results from the name analysis unit into one of a first resource realization expression containing at least one ordered pair of a first resource element string containing resource search expressions used to designate real resources and a first realization element string containing information used to determine procedures that process the real resources determined from the one of the first resource element string, and a second resource realization expression containing at least one ordered pair of a second resource element string containing resource names and first context search expressions used by the context search unit to search the at least context maintaining unit and a second realization element string containing information used to determine procedures that process the resources determined from the second resource element string; and a self-constructing unit that creates a context maintaining unit equivalent to the at least one context maintaining unit, the system further comprising:

a common constructing unit that receives a context expression output as information necessary in order for another resource management system to create second context search expressions in order to search the desired context maintaining unit from among the at least one context maintaining unit containing a self-constructing unit that creates a context maintaining unit equivalent to the at least one context maintaining unit, and to create a context maintaining unit equivalent to the at least one of the context maintaining units searched on the basis of the second context search expressions, and to start the self-constructing unit, wherein the self-constructing unit, which is started by the common constructing unit creates a context maintaining unit, which is searchable by the context search unit on the basis of the context expression and the context search unit searches the context maintaining unit corresponding to the first search expressions obtained from the name conversion unit of the context maintaining unit created by the self-constructing unit and delivers to the context maintaining unit, which was searched, a resource name which is made to correspond with the first context search expressions.

29. The system of claim 28, wherein the context maintaining unit further comprises:
an extraction unit that outputs the context expression.

30. The system of claim 28, wherein the common constructing unit reads the context expression from a medium, which is partitionable by the computer system and which is loaded into the computer system.

31. The system of claim 28, wherein the common constructing unit can overwrite the name conversion unit in the context maintaining unit being created.

32. A resource management system, of the type wherein processes are applied to real resources, which are previously input into a computer system that performs information processing, to obtain new resources, the system comprising:

a plurality of context maintaining means for respectively establishing a correspondence with attributes, wherein each of the context maintaining means comprise:

attribute maintaining means for storing in memory attributes of the respective context maintaining means;

name analysis means for performing name analysis on resource names using as input resource names given to the resources, to obtain name analysis results; and name conversion means for converting name analysis results from the name analysis means into one of a first resource realization expression and a second resource realization expression, wherein the first resource realization expression contains at least one ordered pair of a first resource element string containing resource search expressions used to designate real resources and a first realization element string containing information used to determine procedures that process the real resources determined from the first resource element string, and the second resource realization expression contains at least one ordered pair of a second resource element string containing ordered pairs composed of resource names and first context search expressions used to search at least one of the plurality of context maintaining means and a second realization element string containing information used to determine procedures that process the resources determined from the second resource element string; and the system further comprising:

selection means for creating second context search expressions used in searching the at least one of the plurality of context maintaining means on the basis of the expressions previously input, using as input the expressions used to select the at least one of the plurality of context maintaining means;

context search means for searching the at least one of the plurality context maintaining means having attributes in accordance with the first context search expressions obtained by the name conversion means of the respective context maintaining means and context maintaining means having attributes in accordance with the second context search expressions created by the selection means; and extraction means for outputting a context expression that includes information necessary to create context maintaining means equivalent to the context maintaining means searched by the context search means on the basis of the second context search expressions.

33. A resource management system, of the type wherein processes are applied to real resources, which are resources previously existing in a computer system which performs information processing, to obtain new resources, the system comprising:

context search means for searching at least one context maintaining means, the at least one context maintaining means comprising:

attribute maintaining means for storing in memory attributes of the context maintaining means;

name analysis means for performing name analysis on the resources names using as input the resource names given to the resources, to obtain name analysis results;

name conversion means for converting the name analysis results from the name analysis means into one of a first resource realization expression containing at least one ordered a pair of first resource element string containing resource search expressions used to designate real resources and a first realization element string containing information used to determine procedures that process the real resources determined from the first resource element string; and a second resource realization expression containing at least one ordered pair of a second resource element string containing ordered pairs formed of resource names and first context search expressions used by the context search means to search the at least one context maintaining means and a second realization element string containing information used to determine procedures that process the resources that are determined from the second resource element string; and constructing means for receiving a context expression output as information necessary for another resource management system to create second context search expressions in order to search desired context maintaining means from among the at least one context maintaining means in the resource management system and that creates context maintaining means equivalent to the at least one context maintaining means searched on the basis of the second context search expressions, wherein the context search means is means into which are input the first context search expressions obtained by the name conversion means in the context maintaining means created by the constructing means and which searches the at least one context maintaining means having the attributes corresponding to the first context search expressions.

* * * * *